United States Patent [19]
Pouschine et al.

[11] Patent Number: 5,918,232
[45] Date of Patent: Jun. 29, 1999

[54] MULTIDIMENSIONAL DOMAIN MODELING METHOD AND SYSTEM

[75] Inventors: Nicholas Pouschine, Fremont; Kenner G. Stross, Oakland; Michael L. Brill, San Francisco, all of Calif.

[73] Assignee: Whitelight Systems, Inc., Palo Alto, Calif.

[21] Appl. No.: 08/978,168

[22] Filed: Nov. 26, 1997

[51] Int. Cl.⁶ .................................................. G06F 17/30
[52] U.S. Cl. .............................. 707/103; 707/2; 707/3; 707/4
[58] Field of Search .................... 707/103, 2, 3, 707/4

[56] References Cited

U.S. PATENT DOCUMENTS

| | | | |
|---|---|---|---|
| 5,367,619 | 11/1994 | Dipaolo et al. | 395/149 |
| 5,495,608 | 2/1996 | Antoshenkov . | |
| 5,560,007 | 9/1996 | Thai . | |
| 5,592,666 | 1/1997 | Perez . | |
| 5,664,172 | 9/1997 | Antoshenkov . | |
| 5,666,528 | 9/1997 | Thai . | |
| 5,742,738 | 4/1998 | Koza et al. | 395/13 |

*Primary Examiner*—Wayne Amsbury
*Assistant Examiner*—Cheryl R. Lewis
*Attorney, Agent, or Firm*—Larry B. Guernsey; Michael J. Hughes

[57] ABSTRACT

A system and method for computer modeling (10) and for creating hyperstructures (51) which are to be contained in a computer memory, which obtains measurements of physical objects and activities which are related to the entity to be modeled in the computer hyperstructure (51). The measurements are transformed into computer data which corresponds to the physical objects and activities external to the computer system (10). A plurality of independent dimensions (54) are created, where each dimension (54) includes at least one element (58). A plurality of cells (56) are created, each of which is associated with the intersection of two or more elements (58), each cell (56) being capable of storing at least one value. At least one rule domain (60) is associated with at least one cell (56), the rule domain (60) including at least one rule for assigning values to the associated cells (56). A domain modeling rule set (126) is prepared (300), which determines which of the rules will provide the value associated with each of the cells (56) wherein application of the domain modeling rule set (126) to the hyperstructure (51) causes a physical transformation of the data corresponding to said physical objects which are modeled in said hyperstructure (51).

Also disclosed is a method for querying computer hyperstructures (51), a Hyperstructure Query Language, and a "cell explorer", which allows direct viewing of the applied formulas that produce a specific value for a cell (56).

18 Claims, 16 Drawing Sheets

MULTIDIMENSIONAL DOMAIN MODELING METHOD AND SYSTEM

TECHNICAL FIELD

The present invention relates generally to database manipulation techniques, and more particularly to analytical processing methods. The inventors anticipate that primary application of the present invention will be for modeling of various aspects of businesses as an aid in decision making and for long-term strategy formulation.

BACKGROUND ART

The modern world can be characterized in terms of ever-increasing complexity. In the business world in particular, most companies face intense competition, and constantly changing consumer preferences. These companies must deal with the impact of new laws and regulations in some areas while experiencing uncertainty from the effects of deregulation in other areas. A business can expect competition not only from other local businesses but also from national and international companies as well. The broad scope of worldwide competition further increases the number of variables to be considered. In an effort to deal more effectively with this volatile environment, many businesses have turned to computer modeling to more accurately calculate the effect of changing variables on business performance.

Computer modeling allows great quantities of data to be utilized in the construction of data models. A data model is a collection of conceptual tools for describing real-world processes to be modeled based on data from the database, and the relationships among these processes. There are several variations of the database organization methods that are used in the construction of data models. A relational database uses a method in which files are linked together as required. In a non-relational system, such as hierarchical or network type, records in one file contain embedded pointers to the locations of records in another. These are fixed links which are set up in advance to speed up processing. In a relational database, relationships between files are created by comparing data, such as accounts and names. A relational system is more flexible, and can take two or more files and generate a new file that meets matching criteria, such as the names of customers who bought a certain product.

In order to use relational databases, a Structured Query Language (SQL) was developed to interrogate and process data. SQL can be used as a fill-blown programming language, or SQL commands can be embedded within a programming language to interface with a database.

The DataBase Management System (DBMS) is the software that manages the database. It allows for creation of tables and the processing done in relation to these tables. Most all DBMSs today are actually Relational DBMSs (RDBMS), which manage the relationships between tables. The DBMS creates tables by defining individual elements of data that fill them. These data fields are called "attributes" in a relational database. When data is entered, updated, queried, or when reports are generated, the application communicates with the DBMS in SQL.

A Decision Support System (DSS) is an information and planning system that allows a user to analyze information and predict the impact of decisions before they are implemented. A DSS is an integrated set of programs that share data. These programs might also retrieve from external sources industry data that can be compared and used for statistical purposes.

Large companies may have millions of customers and thousands of products. When a trend in the marketing of a certain product or product line is to be tracked, multiple years worth of data may be required, resulting in a huge amount of data to be manipulated. Managers and executives may want views of several aspects of the data, such as summaries by region, product type and year. This kind of search is not easily handled by a relational database.

In response to business needs of this sort, a database architecture called the On Line Analytical Processing database (OLAP) has been developed. This data model is conceptualized as a multidimensional cube or block composed of smaller "cells". A simple three-dimensional model can be visualized as a cube in which data resides at the intersections of elements which comprise the dimensions. A simple example would have divisions of a company "A", "B", and "C" along an "X" axis dimension, time in years, such as "1996", "1997", and "1998" along a "Y" axis dimension, and a financial dimension including the "Sales", "Units", and "Profits" along a "Z" axis. The individual components of the dimensions are called "elements", and in this example include A, B and C from the "company" dimension, Sales, Units and Profits from the "financial" dimension, etc. Once this model is constructed, a user can specify data to be extracted from a particular cell of the model, for example the projected profits expected from B company in the year 1998. The contents of the cells may be accessed from database records for known quantities or they may be calculated by applying known business or mathematical principles to data from the database.

Within the larger classification of OLAP there are two main variations, MOLAP and ROLAP.

Multidimensional OLAP (MOLAP) allows the user to load data into a proprietary format database and precalculate all the cells in a cube. Users can then enter queries against that cube. Since the entire cube is calculated in advance, response to queries can be very fast. However, loading and precalculating the entire cube can take many hours or days, and changes to the data or model are not easily implemented. MOLAP may result in the unnecessary expenditure of effort and expense, since all cells are precomputed and stored, regardless of whether anyone ever requires their data. Because of the necessity to construct each cell, MOLAP is limited to relatively small datasets, and generally MOLAPs are poorly integrated with underlying relational databases. MOLAPs also have the disadvantage of being complex to administer. Additionally, the MOLAP cubes cannot share data, or metadata (data that describes the included data) with other cubes. Introduction of hypothetical information to produce "what-if" type analysis is allowed on only a limited basis.

MOLAP is especially used in budgeting and planning applications. Examples of MOLAP software are Oracle Express™ and Arbor Essbase™.

Relational OLAP (ROLAP) allows the data to stay in a data warehouse until a user submits a query. The ROLAP server receives the query, and translates it into SQL queries that are sent to the data warehouse. The server then receives the data, performs further calculations if required and returns the results to the user. In contrast to MOLAP, cells in the ROLAP cube are calculated as required "on the fly" in a virtual cube, and the cells are discarded after the query is complete.

Traditional ROLAP also has its own disadvantages. Business modeling is generally very limited, and the database typically needs much tuning and administrative attention.

Performance may be marginal, and processing of hypothetical information for "what-if" analysis is usually not possible. Also ROLAP products generally support only a small number of interactive users.

ROLAP is especially used in sales and marketing analysis. Examples of ROLAP software are MicroStrategy Metacube™ and Information Advantage™.

In both types of traditional OLAP, there is a database infrastructure, which is usually developed and maintained by an Information Technology (IT) department. Development of OLAP models usually follows a cycle of model building, analysis based on the model, validation of the analysis and publication of results, which leads to further refinements and additions to the model, and so on. In traditional OLAP, the IT department is usually involved with construction of the models, validation and publication of results, while the end user is involved only with the analysis phase of the cycle. This procedure is something of a necessity for most OLAP programs, since they are largely designed to be implemented by personnel with at least some knowledge of computer programming, such as a company's IT department. This leads to a certain isolation of the end user (who may not be deeply computer literate) from the models which he may be manipulating. The end user may not be aware of certain unshared assumptions built into the model. Additionally, the development cycle may be constantly interrupted, sometimes for weeks or months at a time, because the user must involve the IT department for even minor modifications of the models, and then for publication of the results.

A better type of OLAP would provide intuitive user interfaces, which non-programmers could easily utilize to build and modify models, and to publish results. This would return control of the modeling and publishing portions of the cycle to the same end user who would perform the analysis, while the IT department could be concerned with maintaining the database infrastructure. A user could therefore have an intimate knowledge of how a result is obtained, because he would have built the model himself and could determine the assumptions made in the model construction. Better yet would be a system in which the formulas and rules utilized in calculating a value could be accessed and modified as needed to make the model more accurate, or a system in which hypothetical values or assumptions could be introduced to observe how the outcome would be affected. This kind of OLAP modeling in which control is distributed to the end-users, rather than being centrally controlled by an IT department, shall be called a "Distributed OLAP" or DOLAP for short.

Consequently, there is great need for a computer on-line analytical processing and modeling system that can utilize large databases in a relational manner, and a system that at the same time offers large-scale modeling, requires less administrative attention to maintain, supports many interactive users and allows easy insertion of hypothetical values to produce "what-if" analysis.

DISCLOSURE OF THE INVENTION

Accordingly, it is an object of the present invention to provide a computer modeling system and method which is not limited to use in small data sets.

Another object of the present invention is to provide a computer modeling system and method that does not require pre-calculation of all data cells, and which allows data to remain in database warehouses until needed.

Yet another object of the invention is to provide a computer modeling system and method which can integrate well with relational databases.

Still another object of the invention is to provide a computer modeling system and method which is less complicated than the prior art, and which non-programmers may use to build and analyze models.

A further object of the invention is to provide a computer modeling system and method which allows easy modeling of hypothetical data for easy "what if" analysis.

A yet further object of the invention is to provide a computer modeling system and method which allows the user to easily review the formulas and rules which are the basis for calculation of model values.

A still further object of the invention is to provide a computer modeling system and method that can support a large number of users in a distributive manner.

An additional object of the invention is to provide a computer modeling system and method which on the one hand allows more general access to model construction and use, but which also provides secure regulation of such access. in a computer modeling system having at least one data storage means, a data processing means, input means, and output means, the steps comprising:

Briefly, one preferred embodiment of the present invention is a method for creating multidimensional data models or hyperstructures, which are to be contained in a computer memory. Measurements of physical objects and activities which are related to the entity to be modeled in the computer hyperstructure are obtained, and these measurements are transformed into computer data which corresponds to the physical objects and activities external to the computer system. A plurality of independent dimensions is constructed within a hyperstructure from the computer data, where each dimension has at least one element. A number of cells are created, each of which is associated with the intersection of at least two elements, each cell being capable of storing one or more values. This embodiment provides at least one rule domain associated with one or more cells, each rule domain including one or more rules for assigning values to the associated cells. A Domain Modeling Rule Set is prepared which prioritizes the rules and determines which of the rules will provide the values associated with each of the cells in the hyperstructure. The application of the domain modeling rule set causes a physical transformation of the data corresponding to the physical objects which are modeled in the hyperstructure. A "cell explorer" is also provided, which allows direct viewing of the applied formulas that produce a specific value for a cell. The preferred embodiment of the present invention also utilizes a unique query language, named HQL, for Hyperstructure Query Language, which has been developed for use with multidimensional models.

A second preferred embodiment is a method of querying a multidimensional computer modeling data structure or hyperstructure in a computer system having at least one data storage device, a data processing device, an input device, an output device, a hyperstructure constructed in one data storage device, a calculation engine, a Domain Modeling Rule Set Preparation Module, a query engine, and an evaluator which communicates with an SQL generator, a math library, a cache retrieval device and a sort and search processor. The method includes the steps of inputting a query, parsing the query; creating a query component tree, inputting model metadata into the Domain Modeling Rule Set Preparation Module, generating a Domain Modeling Rule Set from the Domain Modeling Rule Set Preparation Module, inputting the Domain Modeling Rule Set into the calculation engine, and generating an execution tree with rules from the calculation engine. This is followed by inputting the execution tree with rules to the query engine, generating an optimized execution tree from the query engine, inputting the optimized execution tree to the evaluator, and communicating between the evaluator and any of a number of data reference devices. An execution tree with results is generated, the query results are packaged and the results displayed in an output device.

A third preferred embodiment is a computer system for modeling a number of variables which includes at least one data storage device, a data processor, input and output devices, and a method for creating data models or hyperstructures having one or more independent dimensions. Each dimension has one or more elements and a number of cells, each of which is associated with the intersection of at least two elements, where each cell is capable of storing one or more values. This embodiment provides one or more rule domains associated with one or more cells, each rule domain including one or more rules for assigning values to the associated cells. A Domain Modeling Rule Set is prepared which prioritizes the rules and determines which of the rules will provide the values associated with each of the cells.

An advantage of the present invention is that it can be used with very large databases.

Another advantage of the present invention is that it operates in a relational manner with databases so that pre-calculation of all data cells is not required. This greatly reduces the set-up time for making the model and also reduces effort and storage requirements.

Still another advantage of the invention is that it is much less complicated to use than the prior art, so that non-programmers may use it to build and analyze models. Changes to the model can be easily made without having to spend a great deal of time rebuilding it.

Yet another advantage of the invention is that the user who conducts the analysis can also construct the model. This allows more direct involvement by the user in the specifics of how the model functions. It also allows the Information Technology department of a company to concentrate on maintaining the database, rather than administering the model construction, as generally occurred in the prior art.

A further advantage of the invention is that it allows the user to easily review the formulas and rules that are the basis for calculation of model values. Thus the user can have a more intimate knowledge of the assumptions which have been incorporated into the computer model.

A still further advantage of the invention is that it allows less interruption of the development cycle, since the user who analyzes the data can easily make modifications to that same model to produce the desired results.

A yet further advantage of the invention is that it allows easy modeling of hypothetical data for easy "what if" analysis.

An additional advantage of the invention is that although a large number of users can be supported and data can be easily shared between models, access can be restricted and regulated in a secure manner.

These and other objects and advantages of the present invention will become clear to those skilled in the art in view of the description of the best presently known mode of carrying out the invention and the industrial applicability of the preferred embodiment as described herein and illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
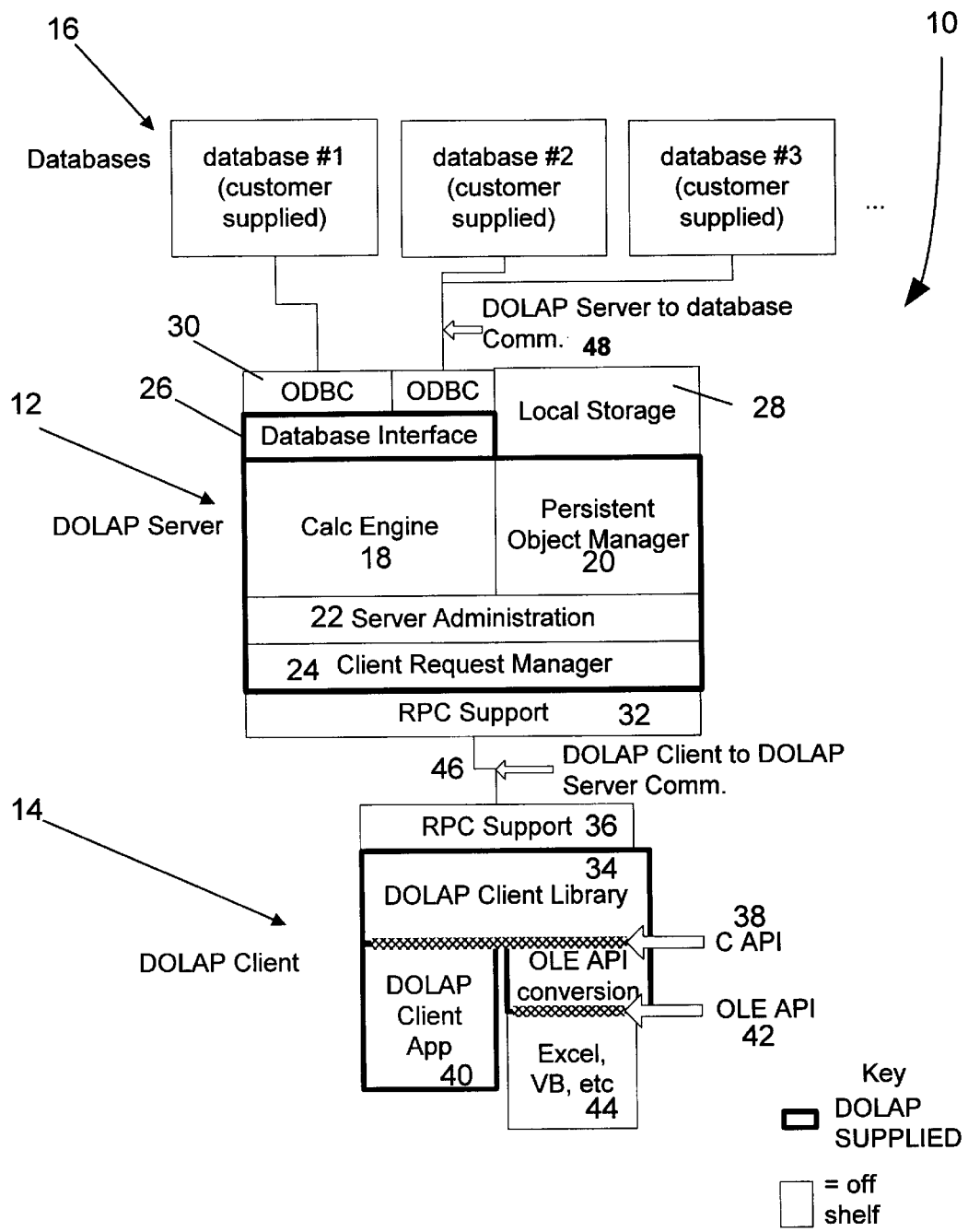
FIG. 1 shows the basic components of the DOLAP system in block diagram form.

A preferred embodiment of the present invention is a Distributed On-Line Analytical Processor (DOLAP) and a method for using it. As illustrated in the various drawings herein, and particularly in the view of FIG. 1, a form of this preferred embodiment of the inventive device is depicted by the general reference character 10.

As is usual in systems employing computer software, there is a great deal of terminology involved (including acronyms) which is specific to the field. Some familiarity with basic terms is helpful to later discussions of the invention, thus the following terms relating to relational data base model building in general, and to the present DOLAP invention in particular, are introduced in the partial glossary below:

GLOSSARY

Attribute—An attribute identifies additional information available about elements at a particular hierarchy level which can be used to determine which elements might be of interest for further analysis.

BLOB—An arbitrary set of data stored in the POM. DOLAP has no knowledge of the contents, but provides an API to scan, select, read, and write the BLOBs. DOLAP also stores its worksheets as BLOBs.

Cell address—A specification of one element from each of the dimensions necessary to locate a cell in the datacube. An address is expressed as (element | element | . . . | element). If an element is ambiguous between defined dimensions, it is disambiguated as dimension.element.

Column description—Describes properties of a column in a table used in a DOLAP model. Includes the column name and its datatype.

Database description—Describes attributes of a database used in a DOLAP model, such as connection limitations and parameters.

Dimension—A named set of elements, which express business information arranged in a network of sets (parents) and their constituents (children). The network is largely hierarchical, although some elements may appear in more than one group (have multiple parents). Dimensions are orthogonal to each other, such as time vs. geography.

Dynamic element specification—A description of how dynamic elements are created from the database on demand. This process also creates qualifier datamaps for these elements.

Element—A distinctly named member of a dimension. No two elements in a dimension can have the same name. No element can have the same name as any dimension.

Parent elements, in addition to providing a distinct slot in a dimension, group together other elements, referenced in their formula rules, called children. Children may have multiple parents in the same dimension, meaning the children belong to more than one group.

Formula rule—A rule describing how certain cell values are calculated. A formula rule may consist of a rule domain, which identifies the cells to which its result applies, and a means by which it gets values from other cell values or constants. See the glossary entries for each of the types of formula rules for details on how this works.

There are three types of formula rules: standard formula rules, custom formula rules, and collection formula rules.

Group—A named set of users who share the same access rights to a specific set of models. Users can have additional access rights.

Hyperstructure Query Language (HQL)—is used for requesting cells in the datacube, fetching lists of qualifying elements (optionally with their selected attribute values), or fetching lists of unique attribute values.

Info space—A model builder-defined tuple specification where rules exist to determine a value for most of the cells in the tuple. (There may be some relatively small "subspaces" where rules do not exist. For example, the user may have a list of revenue sources, with no associated revenue values, and thus no rules, associated with a grouping parent in a financial statement.) The purpose of an info space is to support DOLAP client applications' ability to steer the user toward areas of the model's datacube which contain meaningful information.

Column Join—Standard RDBMS term; a link between one column in each of two tables.

Table Join—The set of all column joins between two specified tables, which define the one and only link between them. Additional attributes include the "directionality" of the join specified by indicating the one/many to one/many relationship between rows in the two specified tables.

Join Path—A specific sequence of table joins that DOLAP is to use to traverse between two tables. Assigned automatically by DOLAP; may be overridden by the administrator.

Metric database mapping rule—A rule associated with a metric-type element describing how and where information exists in and is retrieved from the database.

A metric database mapping rule consists of the element the rule is attached to and the query information, which describes how to retrieve the information into the result cells.

Model—A named, file-like package consisting of:
* Dimensions, elements, and rules
* Blobs to store third party data and worksheets
* A set of user entered values
* Information spaces Persistent Object Manager—The permanent storage mechanism and associated software modules which store and retrieve all the information associated with models managed by a DOLAP server, including the models, DOLAP schema information, and user and group information.

Qualifier database mapping rule—A rule associated with a qualifier-type element that includes a WHERE clause describing how the qualifier can be used to qualify queries.

A database mapping rule consists of 1) a rule domain (presented as a rule domain in the UI) which identifies the cells to which its result applies, and 2) WHERE clause information.

Qualifier datamaps are created automatically by the dynamic element generation process.

Rule domain—A description of the part of the datacube for which a formula can be used to calculate cell values.

Schema—A set of persistent objects that specify how information is stored in databases, tables and their component columns.

Schema object—Defines database information. Schema information is shared by all DOLAP Models.

A given DOLAP system (i.e. DOLAP Server) has exactly one schema object which is edited with the Schema Browser.

Table description—Information stored in the Schema object about tables used by DOLAP models.

Tuple Specification—A description of some cells in the datacube, consisting of between one and N element-list terms, each corresponding to a different dimension, where N is the number of dimensions in the model.

User—A named person who has the rights to log on to a DOLAP server and a security password.

UEV set—The set of all user entered values in a model.

User Entered Value (UEV)—A single number which is created (or modified) when a user manually types or pastes a value into a cell on a worksheet. The UEV consists of an address, which corresponds to the address of the cell on the worksheet, and a value.

UEVs are commonly used to override numbers for what-if analysis and to enter and edit values for business drivers. "Constant" formulas are handled specially by the DOLAP processor.

DOLAP is a model-based client-server decision support system for multi-dimensional analysis of data stored predominantly in relational Data Base Management Systems. FIG. 1 illustrates the basic elements of the inventive DOLAP system 10. At the broadest level, the DOLAP system 10 includes the DOLAP server 12, the DOLAP client 14, and the customer supplied databases 16.

The server 12 stores little or no end-user data, but rather retrieves that data from databases 16 on behalf of a client user/workstation 14, manipulates the numbers according to a specific business "model", and delivers the results of those calculations to the client 14 over a LAN or WAN. DOLAP caches some data for faster querying and calculating. The cache may be shared between users to improve performance.

The DOLAP server 12 includes a calculation engine 18 which handles the retrieval and caching of data and computation of cell values for the model. The DOLAP server 12 provides results to all queries, calls out to the databases 16 to get values and performs calculations in memory in order to satisfy the queries, and caches values in memory so that subsequent queries requiring these values can use the pre-calculated values already in memory. The calculation engine 18 is divided into a number of cooperating subsystems and data structures, augmented by several auxiliary subsystems which will be discussed below.

The server 12 further includes a persistent object manager 20 which is the permanent storage mechanism and associated software modules which store and retrieve all the information associated with models managed by a DOLAP server, including the models, DOLAP schema information, and user and group information.

The server 12 also includes a server administration section 22, a client request manager 24 and a database interface 26. Additionally, local storage 28 and interfaces for Open DataBase Connectivity (ODBC) 30 and Remote Procedure Call (RPC) 32 support can be obtained off the shelf for use with the DOLAP system 10.

The DOLAP client 14 is any program used by a user on a workstation that communicates with the DOLAP server 12. The client 14 runs on a medium-sized Windows 95™ or NT 4.0 platform (minimum 12 MB RAM, VGA), and provides API-level access to data supplied by the DOLAP server. In addition, the DOLAP client provides user interface tools that support (1) the administrative and model-building functionality needed by all DOLAP applications (including those developed by third parties) and (2) modest end-user analysis and deployment functionality.

The DOLAP client 14 includes a client library 34, and its own RPC support 36. The client library has no User Interface (UI) but provides a C and Visual Basic™ compatible Application Program Interface (APT) 38 which supports a continuously on-line connection to the server 12 using Transmission Control Protocol/Internet Protocol (TCP/IP). The client library 34 is designed so that multiple client applications which access the same server 12 can be running at the same time. The client API 38 can interface with an administration program or other client application 40 or with a web server (not shown) which may be connected through the Internet or an Intranet to a web browser. The client library 34 may also have a separate Object Linking and Embedding (OLE) API conversion library 42 that uses the client library 34 and may provide an OLE-style API to third party tools 44 such as Excel™ or applications written in Visual BasicTM or PowerBuilder™.

The DOLAP clients 14 are connected to the server 12 by means of communications links 46. Customer supplied databases 16 such as Teradata, Sybase IQ, Oracle, Informix and others communicate with the server 12 by means of communications links 48.

Figure 2:
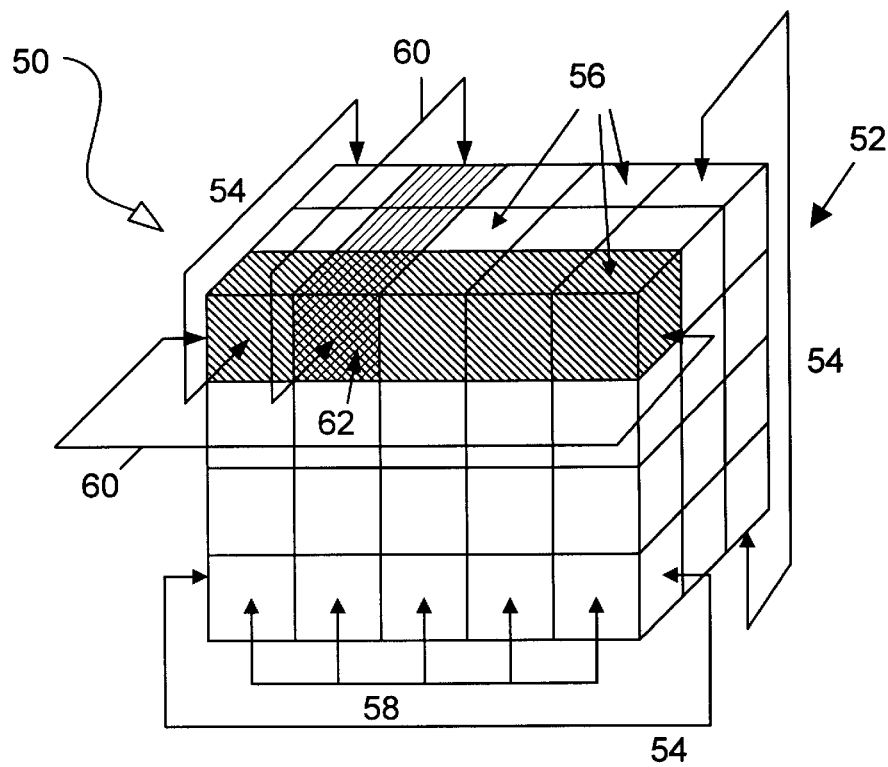
FIG. 2 is an isometric view of a generalized datacube.

A brief discussion of multidimensional model or hyperstructure construction may be helpful in understanding features of the present invention. FIG. 2 shows a generic data structure or computer model 50. A DOLAP model consists of a number of components built, maintained, and used by the DOLAP Server. A model's purpose is to present to a client application an accurate view of the structure of a desired part of a business, and to support the calculation and analysis of the data present within that structure. In a simplified form, a model consists of the model structure, storage for data (BLOBs—including worksheets and data from third party applications), an optional set of user-entered values specified by a client user (what-if values and business drivers, such as a commission rate) and zero or more information spaces (defined areas of the model that contain information). The resulting model can be visualized as a datacube 52 composed of n number of dimensions 54, each of which includes one or more elements 58 whose intersections define a plurality of cells 56. Although three dimensions 54 are illustrated here, the number of dimensions 54 is not limited. For this reason, the datacubes may also be referred to more generally as "hyperstructures 51". A special case of the general category of hyperstructures is defined by the term "hypercube", a term which refers to a cube having more than three dimensions. However, it should be understood that the terms "datacube" and "hypercube" as used here do not imply that the model is limited to structures having equal length sides.

A rule domain tells DOLAP where a rule can be applied. A generalized rule domain is illustrated by the reference character 60. There are many possible rule domains in a particular model, and it is quite possible that a single cell can be located within two or more rule domains simultaneously, as seen in FIG. 2. Here, two rule domains 56, both of which are emphasized by hatched shading, intersect to include a cell 62, which is emphasized by cross-hatching. In establishing the value which will ultimately be calculated for the cell 62, it is then necessary to prioritize the rules that apply and resolve conflicts between rules. These processes will be discussed in detail below.

Dimensions 54 represent the fundamental characteristics of the business area being modeled, and for the purposes of a model are assumed to be orthogonal to each other. Typical dimensions include Finance, Time, Scenario, Organization, Geography, Products, Customers, Competitors, and so forth. Elements 58 are the specific items associated with each dimension. Using the examples above, the Time dimension might have the elements 1994, 1995, 1996 and the set of four quarters for each of those years. The Organization dimension might be composed of the specific names of a holding company's subsidiaries, and the Geography dimension might consist of World-wide, US, Europe, and Asia, with the US being subdivided into North, West, Southeast, and Northeast regions, and so forth. Each cell 56 in the hyperstructure 51 can be addressed by specifying an element 58 from each dimension 54 in the model 50. In general, the elements 58 within a dimension 54 are structured into a hierarchy of parent and child elements. The subdividing of the Geography region described above is an example of the hierarchical relationship among elements. DOLAP hierarchies are not strict hierarchies, because elements can have multiple parent elements.

There are two types of elements 58 which can be added to the model 50. Metric elements represent quantitative values like money, inventory, units of sales, and so on. Qualifier elements represent lists of things such as customers, regions, cost centers, and so on. The combination of these two types of elements yields interesting analysis possibilities such as Revenue by Customer, or Expense by Cost Center. Most elements have rules associated with them that tell DOLAP how to get values for the cells. These rules can be either data maps or formulas, as described below. Some elements can be generated automatically based on information in the database. These elements are called Dynamic Elements. In typical DOLAP installations, many of the elements to be included in the model, or used as part of the model analysis, are represented by entries in database tables. In some cases, the hierarchy associated with the elements can be deduced and extracted from the database. Instead of the model builder manually adding these elements in their hierarchy and their data maps to the model, DOLAP can create the elements dynamically by using the Dynamic Elements option in the Modeler's Workbench. Because DOLAP extracts the elements from the tables, it can also automatically construct the data maps for the elements. For example, the user may want to add elements for each of his customers. If he has a large customer database, he would not want to type in all of the customers manually.

Levels of dynamic elements are created by specifying data mapping information for each level. For each hierarchical level, the data mapping information defines where in the database to get elements for that level of the hierarchy. When the user dynamically generates a hierarchy as part of his model, DOLAP saves the elements in the intermediate levels of the hierarchy with the model. (They are persistent). For the lowest level of the hierarchy (the leaf-level), the user can specify whether or not to save the elements in the model. (They can be persistent or transient). For example, if the user has a million customers, he might want to analyze the customers, but he would not want to store them in his model. When DOLAP needs the customer information during the analysis, the information can be retrieved at that time.

Often, the database tables that are used to create the dynamic elements contain other information that is relevant to, or associated with, the element. For example, the database table used to create a customer hierarchy could also contain the street address, city, state, zip code, and phone number for each customer. These are called attributes of the element. The user can specify attributes for each level of a dynamic hierarchy so he can easily access or analyze information related to the dynamic elements.

Although the DOLAP API will support a variety of presentations of the model's structure and data, the DOLAP client application primarily utilizes treeviews to examine and manipulate the model's structure, and a worksheet to view data. The DOLAP Worksheet presents a multidimensional spreadsheet view of any portion of the datacube, and allows the user to enter what-if values and business drivers. It supports a variety of standard spreadsheet operations, plus others appropriate for multi-dimensional viewing such as pivoting across dimensions and drill-down, -up, and -across. Also, users of the DOLAP Manager application can send their data to a graph window driven by the First Impressions™ custom control for graphs.

Figure 3:
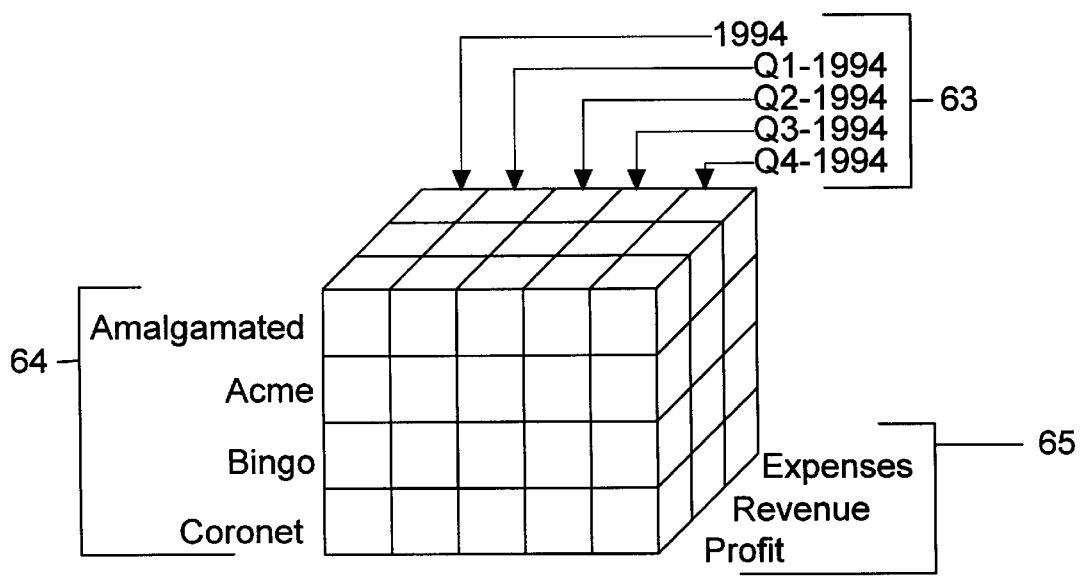
FIG. 3 is an isometric view of an example datacube.

FIG. 3 illustrates a typical example utilizing the three dimensions of Time 63, Organization 64, and Finance 65, with the following structure: Time dimension 63 contains elements 1994, Q1-1994, Q2-1994, Q3-1994 and Q4-1994; Organization dimension 64 contains elements Amalgamated (a holding company), Acme (subsidiary), Bingo (subsidiary), and Coronet (subsidiary); and Finance dimension 65 contains elements Profit, Revenue and Expenses.

The DOLAP architecture utilizes a rule-based methodology which provides strong business modeling capability when dealing with varying levels of dimensionality. This allows for a transparent use of a multi-cube approach to business modeling. Model builders can use any number of dimensions from the data cube. (Other OLAP products only support a single pre-defined hypercube or multiple hypercubes, which limit model-building flexibility, forcing model builders to build models based on the number of dimensions in the data cube.) DOLAP also supports the ability to limit levels of dimensionality by using a Not Specified (NS) condition in the rule domain for an element's formula or data map.

Figure 4:
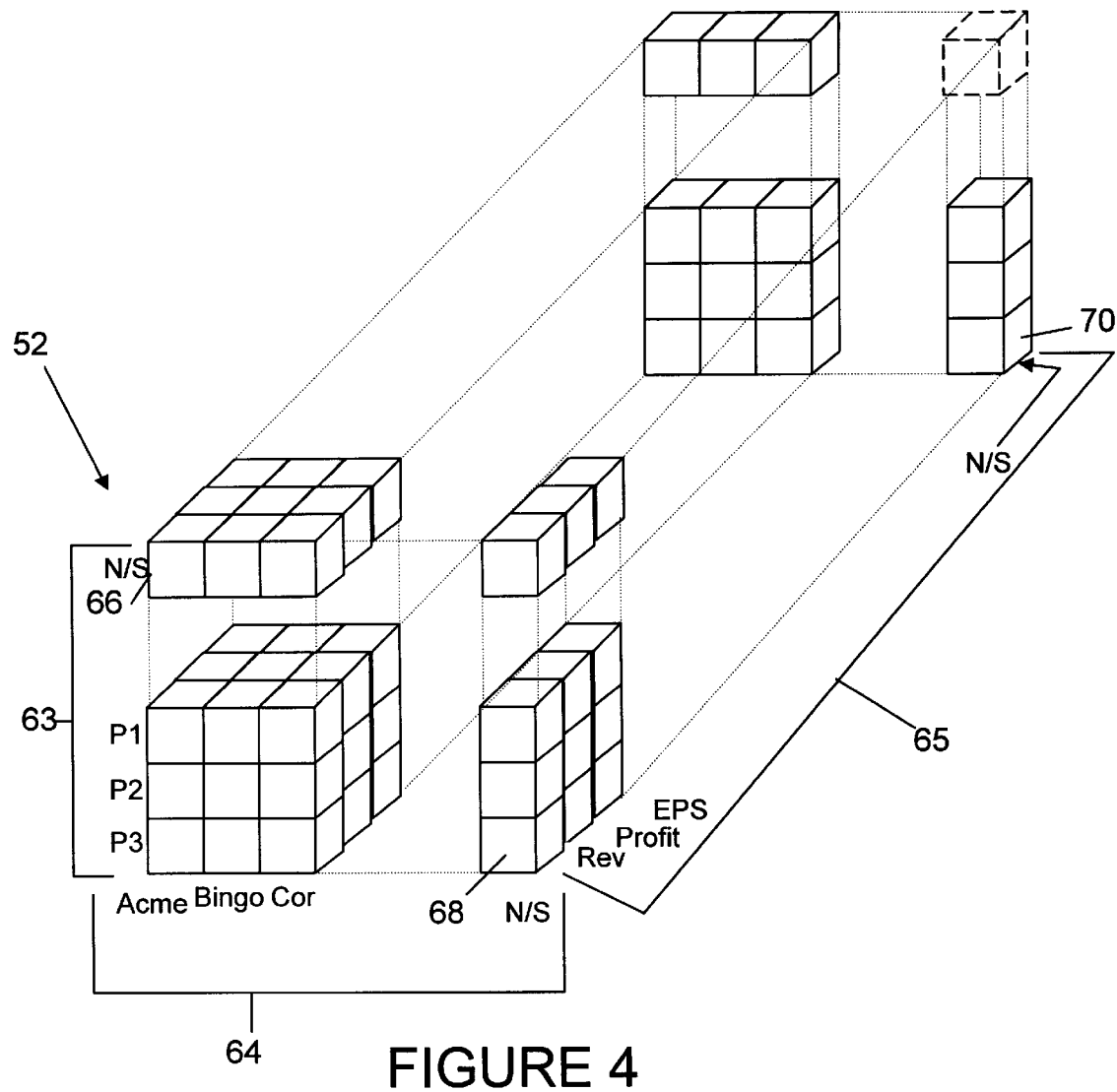
FIG. 4 is an isometric view of an example datacube including several sub-cubes.

FIG. 4 illustrates a hyperstructure 51 from which a sub-cube 66 has been extracted. An element in the Time dimension 63 has been declared NS, as also has an element in the Organization dimension 64, resulting in a second sub-cube 68, and a third element in the Finance dimension 65 has also been Not Specified resulting in sub-cube 70.

To obtain the values for cells in the model, DOLAP uses two types of rules: 1) formula rules which tell DOLAP to compute the cell value mathematically from other cells in the model, for example, Revenue is calculated by multiplying Price times Units Sold; and 2) data map rules which tell DOLAP to retrieve the cell value from the database. Additionally, DOLAP uses a user-entered value (UEV) if it exists.

Formula rules, which are attached to elements, also have associated with them rule domains that define where in the datacube the rules can be used. Formula rule types include standard formulas, custom formulas and collections. Standard formulas take a list of elements and apply an aggregation function. These functions include Sum, Average, Min, Max, and Count. Custom formulas let the user create his own formula comprised of operators and functions applied to elements. Standard formulas can also be used within a custom formula. Collections, which are not actually computation formulas, let the user specify a collection of elements to be considered children of the element that specifies the formula. These collections are used for reporting, rather than for computing. For example, the user may want Revenue and COGS listed as children but not necessarily used in a single formula that calculates the value of Income statement. The user can create a collection (children of Income statement) so the user can drill-down and view them in a worksheet.

In general, formula rules utilize elements from the same dimension as the element whose value they are computing, but there are cases where a formula will compute a value based on elements in other dimensions. For example, in a planning model, the model builder may want to compute the revenue for a particular geographic region as a percentage of the revenue of another geographic region.

Data map rules tell DOLAP where in the databases the raw data used in the calculations is found. These rules indicate a database and table where element-associated data is found, and may have a SQL WHERE clause restricting the data that is returned to just those rows in the table associated with the element. Data map rules are either metric or qualifier mappings. Metric data map rules indicate where data for the element is contained. Qualifier data map rules, for qualifier elements such as time, include information that DOLAP eventually turns into a SQL WHERE clause that identifies the database table rows containing data that applies to the element. The calculation engine uses this information, in combination with information from the other dimensions, to help determine which table must be accessed to obtain data for the model. The datamapping for a qualifier element will have been created by the Dynamic Element Generation process, which created the hierarchy in which the qualifier element exists.

Conceptually, when DOLAP needs a value for a cell whose value comes from the database, it scans the elements that form the cell's address for their data map rules. (To improve performance, the actual algorithm deals with groups of cells.) DOLAP determines which of the possible database tables is the correct one and formulates a SQL query to retrieve the data.

Figure 5:
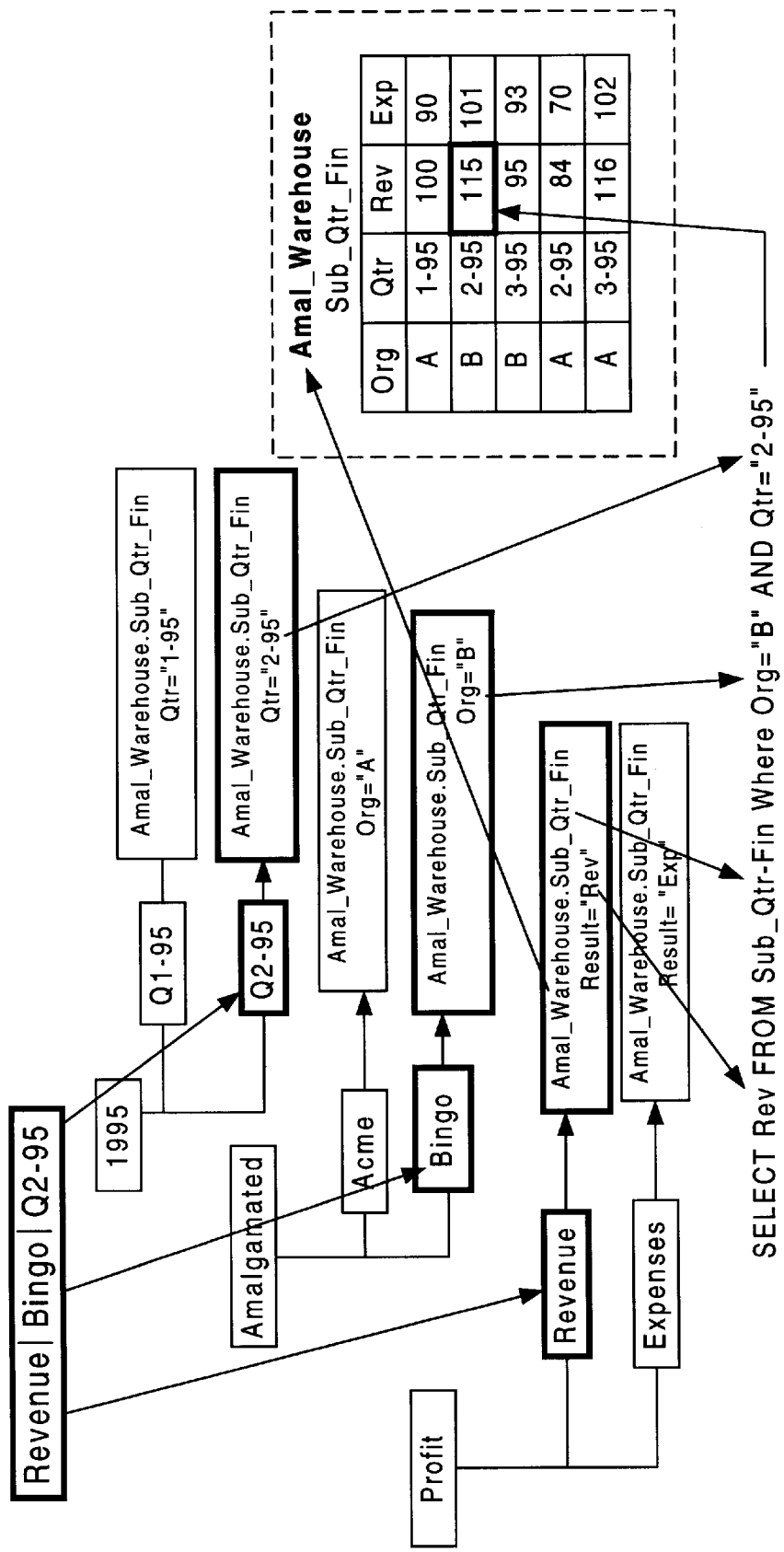
FIG. 5 shows a graph depicting an example of how an HQL query accesses data from a database.

FIG. 5 shows an example of a data retrieval. The Hyperstructure Query Language (HQL) is used for fetching cells in the datacube, fetching lists of qualifying elements (optionally with each element's selected attribute values), or fetching lists of unique attribute values. Although the subject will be covered in more depth below, basically the contents of cells are specified by the rules attached to the elements whose intersection locates the cell. Switching to an element in an orthogonal dimension is depicted by separating vertical lines.

In this case, the HQL query is to locate the revenue from Bingo Corporation for the second quarter of 1995. In SQL, this becomes SELECT Rev FROM Sub_Qtr_fin WHERE Org="B" AND Qtr="2–95". In this example it is assumed that Acme and Bingo are subsidiaries of Amalgamated in the dimension of Organizations, and we want Revenue from the Finances dimension for Q2-95 from the time dimension. This information is stored in a database called Amal_ Warehouse from which the appropriate data value for the required cell may be accessed. Note that in the diagram the data map for "Revenue" is the metric mapping rule that retrieves the actual cell value. The data maps for "Bingo" and "Q2-95" are the qualifier mapping rules that specify the rows from which to get the values.

Fundamental to DOLAP's ability to handle large, complex models is the concept of rule domains. A rule domain tells DOLAP where a rule can be applied, and is evaluated in determining which of the possible rules to apply. Technically, the rule domain for a formula rule is the entire left-hand side of the formula. Most of the time, a formula applies to a single element as in the following example:

Gross Margin=Revenue—Cost of Goods Sold

Here, Gross Margin, the element to which the formula is attached, is calculated using the same formula throughout the model (for example, for all divisions and all products). It is also the formula's (degenerate) rule domain. This occurs so often, in fact, that throughout the specification, the term "rule domain" will generally refer to element specifications in dimensions additional to that of the element to which the formula is attached. For example, 1996|Revenue=1995 | Revenue * 1.25

In this case, since the formula is being attached to the Revenue element, the explicit rule domain is "1996". The complete, implicit rule domain is 1996 | Revenue.

There are cases where a single formula can not be applied so broadly. For example, revenue might be computed quite differently for past, current, and future years. If past years' revenues are the actual revenue values extracted from financial systems databases, the current year's revenues are a forecast pulled from a sales forecasting system database, and future years' values are calculated based on past and current trends, the user would need to create different formula rules for each type of Revenue:

| Rule domain | Rule | Rule type |
|---|---|---|
| 1994 | Revenue = warehouse.actuals.rev | data map |
| 1995 | Revenue = warehouse.forecast.rev | data map |
| 1996 | Revenue = 1995 Revenue* 1.25 | formula rule |

When DOLAP calculates a revenue cell value, it selects the rule to use based on the year value associated with each particular cell. When computing values for cells, DOLAP generally has a variety of methods by which a cell is calculated. Where formulas are composed of commutative operators, such as addition or subtraction without constants, the order of operations is unimportant. However, for formulas including operations such as multiplication and division, the order of operations is important. The DOLAP design incorporates rule prioritization to address this problem while exploiting rule generality as much as possible. To determine how to compute the value for a cell, DOLAP scans all the rules that could apply to the cell and selects one according to its rule precedence algorithms. In general, DOLAP gives preference to rules with more specific rule domains, and to rules specified by the model builder, as opposed to rules inferred by database schema.

A variety of user interface tools are provided. Model Builders use the Library Explorer portion of the client application (to create new models or open existing models) and the Modeler's Workbench (to create the structure of a datacube). The Library Explorer displays the contents of the server's repository using a split window to manage its objects. A Schema Explorer allows users with administrative privileges to specify what databases are to be accessible to the models in a particular library. A SQL Audit facility allows a user to audit HQL queries that are sent from the client to the server and view the series of SQL queries that were generated by the Calculation Engine in the fulfillment of the HQL query. A UserEnteredValue List Window provides a means by which a model user can see which user entered values have been entered into the datacube and delete any which are no longer desirable. A Worksheet is a multidimensional view of a subset of the datacube. It allows custom views of the model to be created and UEVs to be entered.

Figure 6:
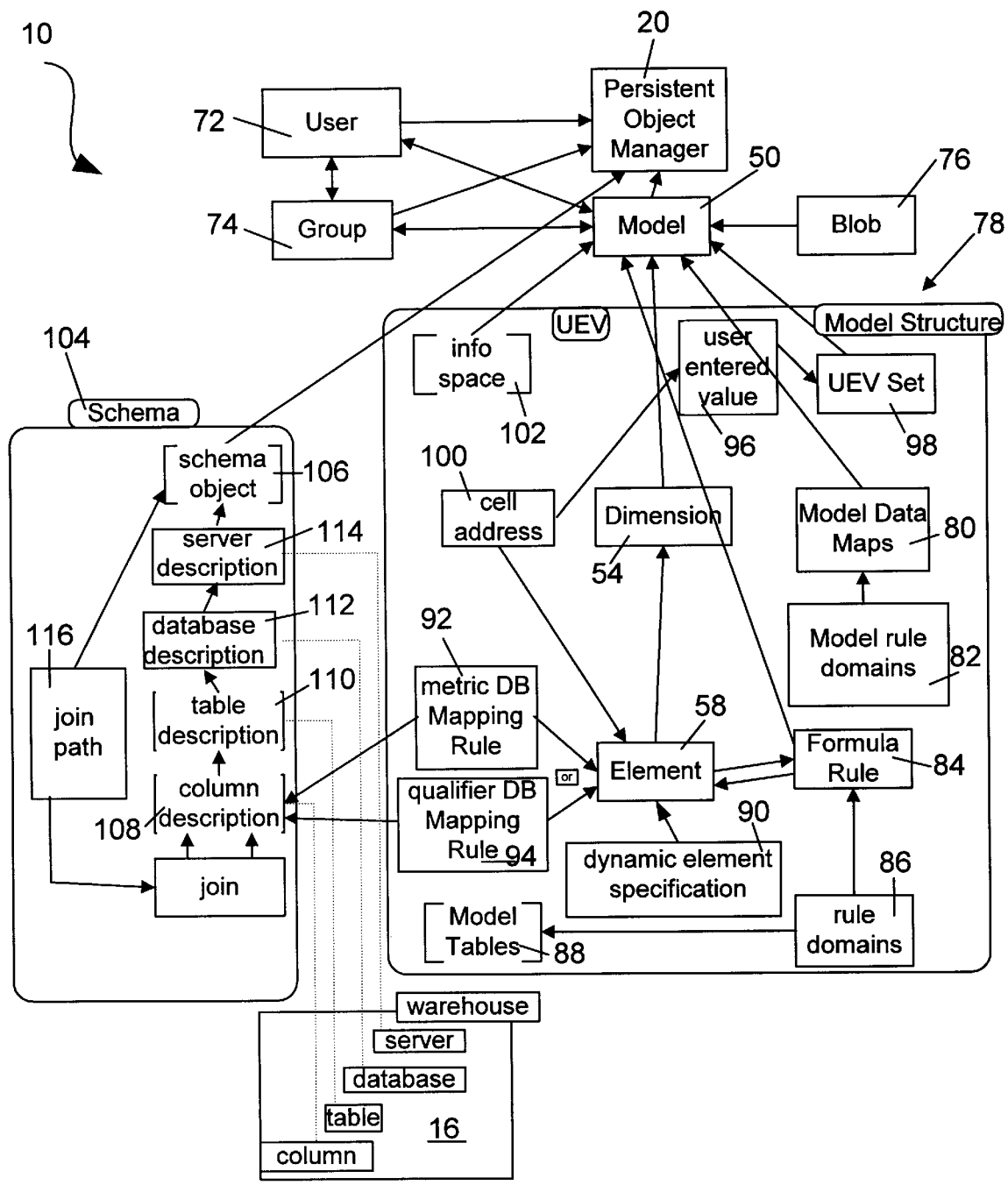
FIG. 6 shows the relationship between DOLAP entities in block diagram form.

FIG. 6 illustrates the relationships between entities involved in a DOLAP modeling system 10. The model 50 is a named file-like package, which receive inputs from many sources. The user 72 is a named person who has access rights to the model 50, either individually or as part of a group 74. The persistent object manager 20 holds the DOLAP models 50 as well as meta-data used by the models managed by the server 12. It also holds BLOBS 76 that are arbitrary data streams stored on behalf of a third party DOLAP client application which are associated with a particular model. A group of related functions have been shown as a model structure and UEV module 78. A group of model data maps 80 contains database-mapping rules that are attached to the model 50. This includes a group of rule domains 82. An element 58, which is included in a dimension 54, can receive input from formula rules 84, which are also included in the model 50. The formula rules 84 include the rule domain section 86, which provides a description of the part of the datacube 52 (see FIG. 2) for which a formula can be used to calculate cell values. The rule domains 86 are also included in the model tables 88. Certain elements, dynamic parents, have dynamic element specifictions which are used to generate hierarchies of elements under the dynamic parents. The DES specifies database tables whose columns contain key values and names for the elements in the hierarchy. Element 58 can also obtain input from either the metric database mapping rules 92 or the qualifier database mapping rules 94, which tell DOLAP where in the databases the raw data used in the calculations is found. The metric data base rules 92 contain rules associated with a metric-type element which represents the "what" part of the name or address of a cell 56 in a datacube 52 (see FIG. 2). Generally the metric rules 92 associate a measure such as Revenue with a numeric column. The qualifier data map rules 94, for qualifier elements such as time, include information that DOLAP eventually turns into a SQL WHERE clause that identifies the database table rows containing data that applies to the element. The calculation engine 18 (see FIG. 1) uses this information, in combination with information from the other dimensions, to help determine which table to access to get data for the model 50. The datamapping for a qualifier element will have been created by the dynamic element generation process that created the hierarchy in which the qualifier element exists.

A User Entered Value (UEV) 96 is a single number which is created (or modified) when a user manually types or pastes a value into a cell 56 in a model 50 (see FIG. 2). This UEV consists of an address (which corresponds to the address of the cell) and a value. These UEVs 96 supersede the values calculated from rules at the same level of specificity (unless there are other more specific rules) and are used by DOLAP to calculate the values for other cells whose values depend on them. UEVs 96 are commonly used to override numbers for what-if analysis and to enter and edit values for business drivers. The UEVs 96 are stored in a UEV set 98 which is included in the model 50.

A cell address 100 specifies one element from each of the dimensions necessary to locate a cell 56 in a datacube 52 (see FIG. 2) and can be used to specify UEVs 96.

Only a tiny fraction of the cells 56 in a model 50 actually represent meaningful information. Users and client applications attempting to navigate the datacube can frequently benefit from guidance as to where the useful information resides in the datacube 52 (see FIG. 2). The DOLAP Client Application lets the model builder create and maintain an infospace 102 that defines a set of dimension and default element combinations which in turn define useful portions of the DOLAP datacube.

The schema 104 is a set of persistent objects stored in a repository that specifies how information is stored in databases, tables and their component columns. Schema 104 contains the physical table configuration and relationship between tables of data. The schema object 106 contains the descriptions of the columns 108, tables 110, databases 112, and servers 114 corresponding to the contents of the data warehouses 16.

Columns in specified tables can be linked or joined together. The join path 116 is the preferred join out of all possible joins between any two tables in the databases of a DOLAP schema, and may be the default or user-set path.

Figure 7:
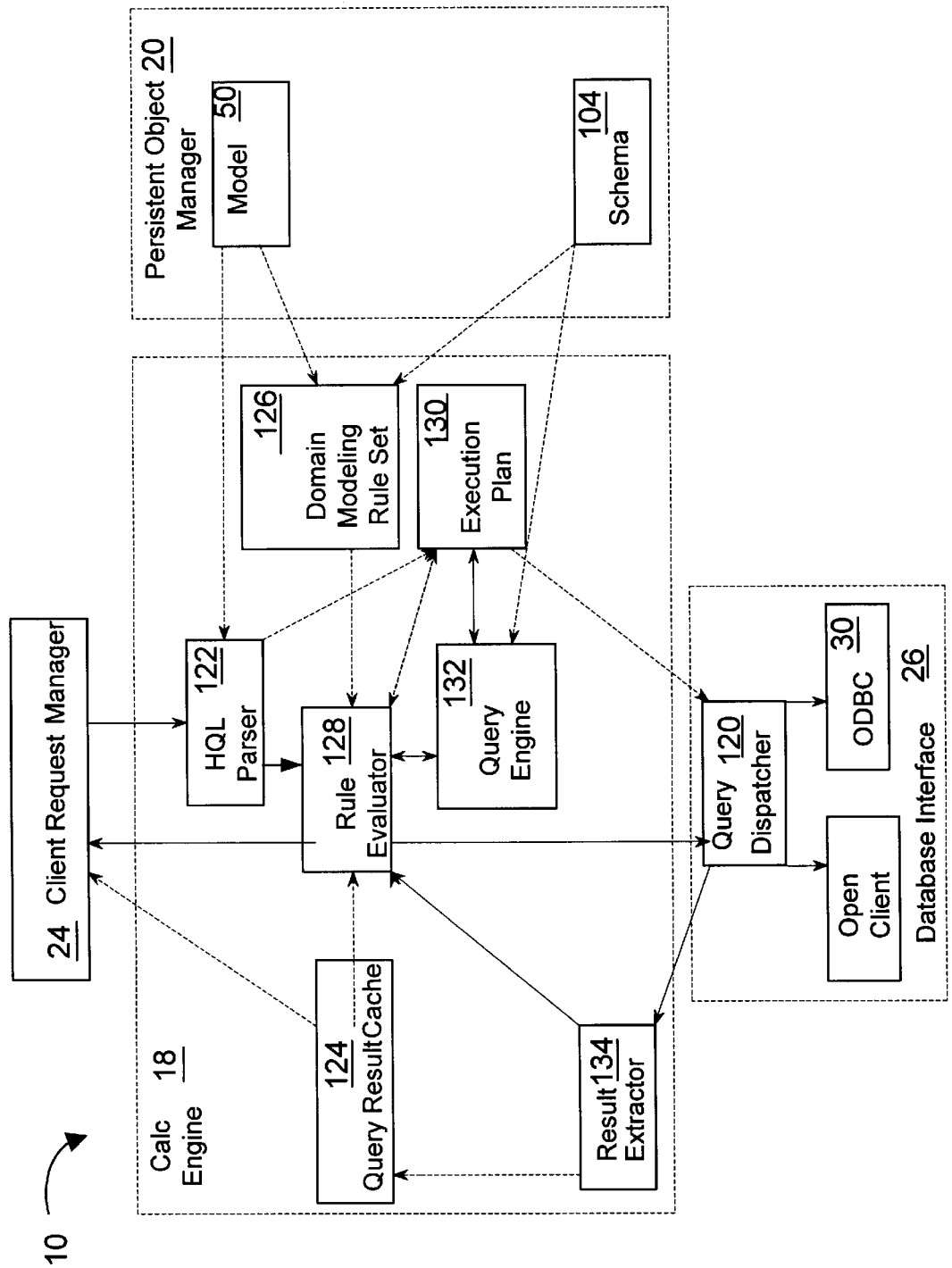
FIG. 7 shows the internal sub-systems of the calculation engine and its relationship with other DOLAP sub-systems in block diagram form.

The purpose of DOLAP 10 is to retrieve data from one or more databases 16 (see FIG. 1), perform calculations as specified by the model 50, and return values for specified cells 56 (FIG. 2) to users via client applications 40 (FIG. 1). The core part of this functionality, the retrieval and caching of data and computation of cell values for the model, is handled by the calculation engine 18. The calculation engine 18 is divided into a number of cooperating subsystems and data structures, augmented by several auxiliary subsystems. FIG. 7 illustrates the components of the calculation engine 18. It communicates with the client request manager 24, from which the calculation engine 18 receives queries, and to which it returns results in response to these queries. The engine 18 also communicates with the persistent object manager 20 which contains the model 50 and the schema 104. Additionally the calculation engine 18 communicates with the database interface 26 that includes a query dispatcher 120 and an Open Data Base Connectivity (ODBC) portion 30. An incoming client request is routed to an HQL parser 122 which transforms the HQL query from its textual form into an internal representation. After the internal representation of the query is made, the calculation engine 18 looks in the query results cache 124 to see if the query (or any portion of it) can be retrieved from the cache in order to save processing time.

A Domain Modeling Rule Set 126 receives input from both the model 50 and the schema 104, and provides input to the rule evaluator 128, which then communicates with the execution plan 130 and the query engine 132. The query engine 132 creates SQL queries from HQL queries and optimizes these SQL queries by combining them (whenever possible) and also optimizes the performance of the calculation engine 18 by performing as many calculations as possible with SQL statements executed by the database. The SQL is sent to the query dispatcher 120, which accesses the data in the databases through the ODBC 30. The results are sent to the result extractor 134 which communicates with the query result cache 124 and the rule evaluator 128. The results may then be sent to the client request manager 24, and subsequently to the client application.

Figure 8:
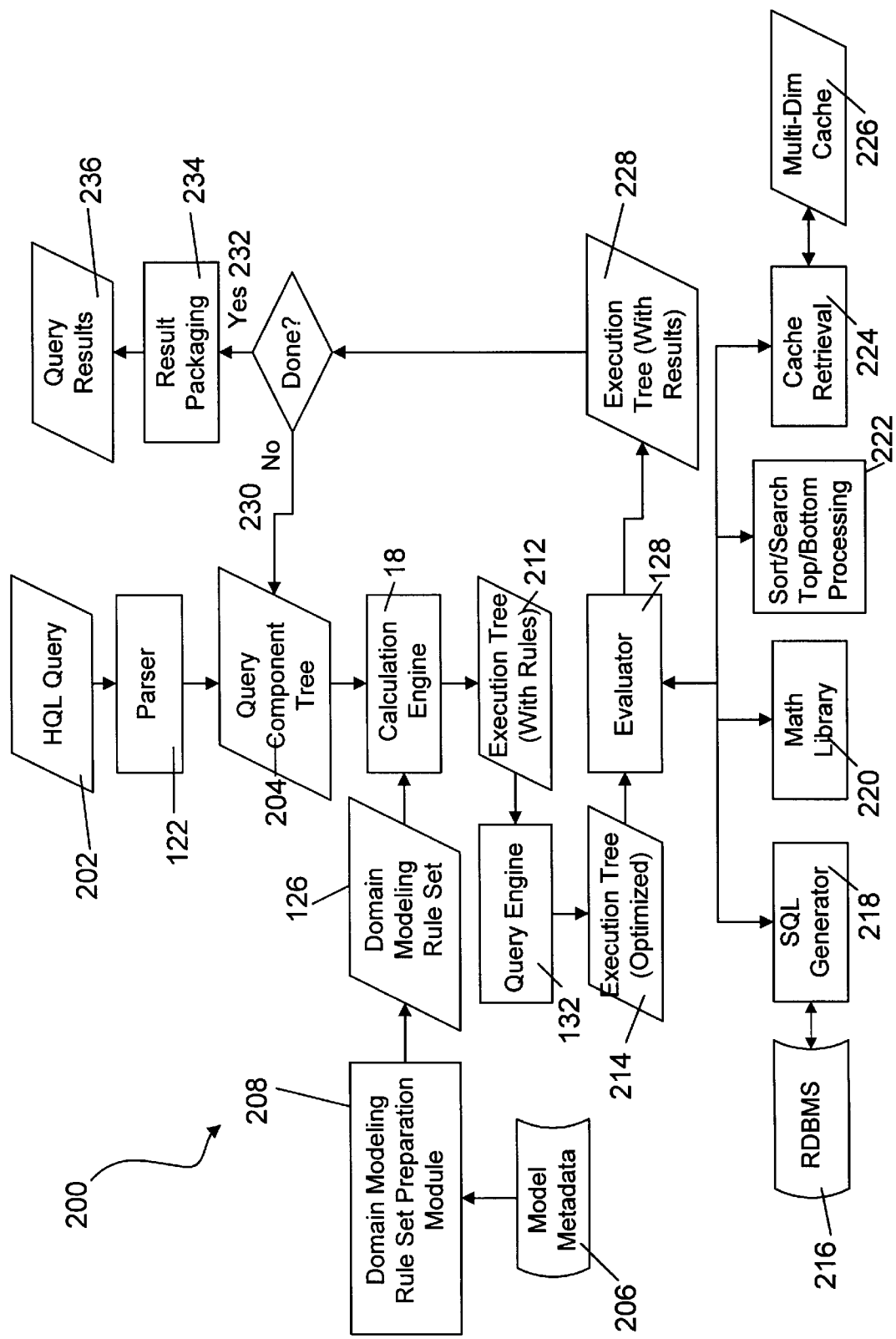
FIG. 8 shows a flow diagram of the major steps involved in answering an HQL query.

The steps involved in this process are shown in FIG. 8 as a generalized flowchart of DOLAP operations in response to a user query.

The steps of the flowcharts to follow may be implemented by one or more software routines, processes, subroutines, modules, etc. It will be apparent that each flowchart is merely illustrative of the broad logical flow of the method of the present invention and that steps may be added to, or taken away from, the flowcharts without departing from the scope of the invention. Further, the order of execution of steps in the flowcharts may change according to different implementations such as interrupt-driven, polled, etc., event-handling. A multiprocessing or multitasking environment could allow steps to be executed concurrently. For ease of discussion, the implementation of each flowchart is referred to as if the flowchart were implemented in a single "routine".

The method 200 starts as a Hyperstructure Query Language (HQL) query 202 which is passed to a parser 122 which converts the HQL text to a query component tree 204 which represents the component parts of the query 202. This is sent to the calculation engine 18. The model metadata 206 is the information about the structure of the model 50 (see FIG. 2) which has been previously constructed. These are provided to Domain Modeling Rule Set Preparation 208 which generates the domain modeling rule set 126, which are then supplied to the calculation engine 18, which takes the applicable rules and adds them to the query tree 204 to produce an execution tree with rules 212 for the query engine 132. This query engine 132 produces the optimized execution tree 214 by combining queries and delegating calculations to the database server, whenever possible. The optimized execution tree 214 is passed to the evaluator 128 which decides whether further data is required from a relational database. If further data is required, evaluator 128 communicates with a Relational DataBase Management System (RDBMS) 216 through an SQL generator 218. Evaluator 128 can also communicate with a math library 220, if a calculation is required, or a sorting and processing system 222, if the process requires ordering of results or sorting in some manner. In order to save processing time, values which have been previously calculated may be obtained from cache retrieval 224 which accesses a multidimensional cache 226. The execution tree with results 228 then proceeds and, if it is done 232, it may be sent to result packaging 234 for eventual output of the query results 236. The query 202 may include an inner query that must be processed before the query as a whole can be processed. In this case after one pass through the process, when arriving at the decision box, the result will be not done 230, and the process will continue around the loop again until completed.

When following the previous process, it is important that the system be able to determine which formulas apply to a certain cell. If there are multiple formulas that apply, there must be a hierarchy of rules established so that the correct formula is used and, consequently, the correct value is assigned. This hierarchy of rules and the associated priorities involved are very important to Domain Modeling.

The Domain Modeling Rule Set 126 (see FIG. 7) is a run-time data structure used by the calculation engine 18 to resolve requests. Domain Modeling Rule Set 126 is prepared from the model description and embodies DOLAP's knowledge of all rules within the complete datacube 52 defined by all the elements 58 of all the dimensions 54 in the model 50 (see FIG. 2). The structure is created by calculating the effective Rule Domain for each metric database map, UEV, and formula rule in the model, and prioritizing them so that the proper rules will be executed. Domain Modeling Rule Set Preparation is triggered by the first HQL request after the model is opened or after the model is changed, unless the only changes were UEV value changes or if user requests to see the rule for a cell.

Domain Modeling Rule Set Preparation is the process of gathering all of the rules from the model, turning them into valid actions that can be used by the calculation engine, and prioritizing them so that the proper rules take precedence. In the process, Domain Modeling Rule Set Preparation must check for conflicts in the rules, i.e. situations where it is ambiguous which rule should take precedence in a case where the results of applying the two rules would yield different results. Domain Modeling Rule Set Preparation supports an Application Program Interface that can specify for a client which specific rule was/would be used to calculate the value for any cell in the model.

Rules drive all computations within the DOLAP Server. They are stored in the model as UEVs, formulas and datamaps and are composed of two parts, 1) a rule domain and 2) an action.

The rule domain specifies the cells whose values can be computed by the rule's action. The rule domain is rectangular, i.e., it is a sub-cube of the model datacube. The rule domain is restricted to the rule domain as specified by the user, but additionally reduced as described below.

DOLAP supports three different kinds of actions: UEVs, datamaps and formulas. UEVs are the simplest rules within DOLAP. The action of UEVs is simply to supply a constant value, while the UEV's address is used as their rule domain. Formulas are attached to specific elements in the model, with the element forming an implicit part of the formula's rule domain. The formula expression itself is the action. Datamap rules map a cell value to the value from a column in a database table. Essentially, a datamap rule is a SQL SELECT statement, specifying which rows from a table have to be selected and which column from the selected rows contains the value.

Additionally, there are autoformulas which are default rules which describe very generic processes, for example, "the value of a parent equals the sum of its children". These "unpromoted" autoformulas are the lowest level in priority of application unless their priority has been adjusted higher to "promote" them. The unpromoted autoformulas only apply where higher priority rules have not been imposed and can therefore be discarded from the prepared rules. A second round of rule promotions will cause additional autoformulas to be retained, where the autoformula refers to a value that will be retrieved via a metric data map. Unpromoted autoformulas for dynamic elements are created from generic autoformulas which are generated from dynamic element specifications.

Figure 9:
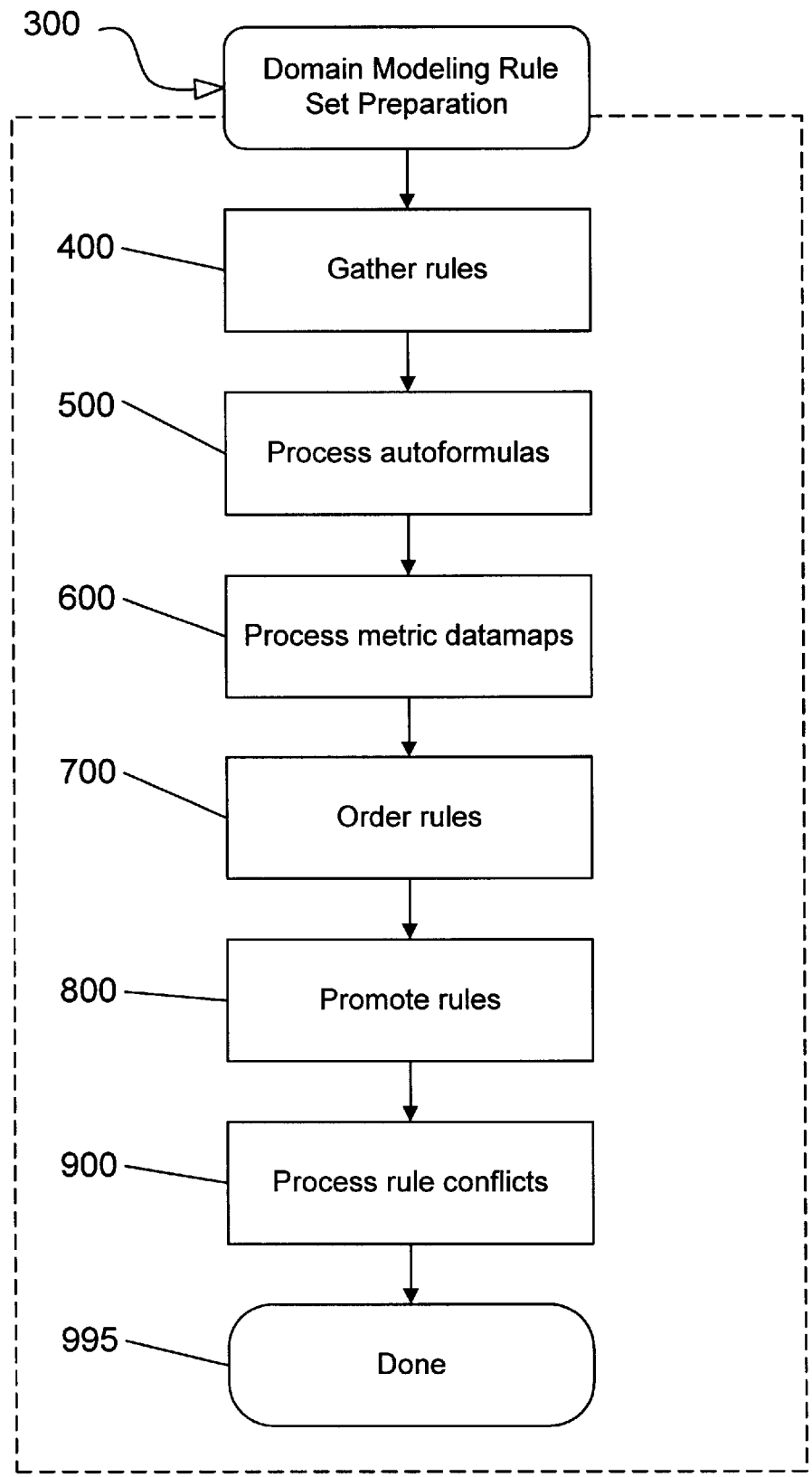
FIG. 9 shows a flow diagram of the major steps in Domain Modeling Rule Set Preparation.

FIG. 9 is a flowchart which shows the general steps involved in Domain Modeling Rule Set Preparation. The smaller steps involved in each general step are shown in greater detail in FIGS. 10–17. The overall process of Domain Modeling Rule Set Preparation is referred to by the reference number 300. In referring back to FIG. 8, this process takes place in Domain Modeling Rule Set Preparation 208, and the end product is the domain modeling rule set 126, which are input to the calculation engine 18. Returning to FIG. 9, the first step in Domain Modeling Rule Set Preparation process 300 is to gather the rules 400 from the model and convert them to the uniform representation that will be used by the calculation engine 18 (FIG. 8). Next, the autoformulas are processed 500, followed by processing the metric datamaps 600. The rules are then ordered 700, certain of the rules are promoted 800, and conflicts between rules are processed 900. Then Domain Modeling Rule Set Preparation is then done 995.

The user enters UEVs explicitly, so their conversion is straightforward. The elements that are specified in the address are the rule domain for UEVs. For dimensions not specified in the address, the Rule Domain is set to include all elements in those dimensions, including the Not Specified (N/S) element.

Formulas are also entered by the user explicitly, and are attached to the elements. The rule domains are initially set to the rule domain specified by the user, with the rule domain in thedimension of the element containing just that element.

List formula rule domains require additional processing. All the elements that have an attribute "do not aggregate" are removed from the rule domains of the list formula rules, which would otherwise be used to compute the "do not aggregate" element. The one exception is that if the element that this formula is attached to is marked with "do not aggregate", DOLAP will not remove this element from its own formula's rule domain.

Figure 10:
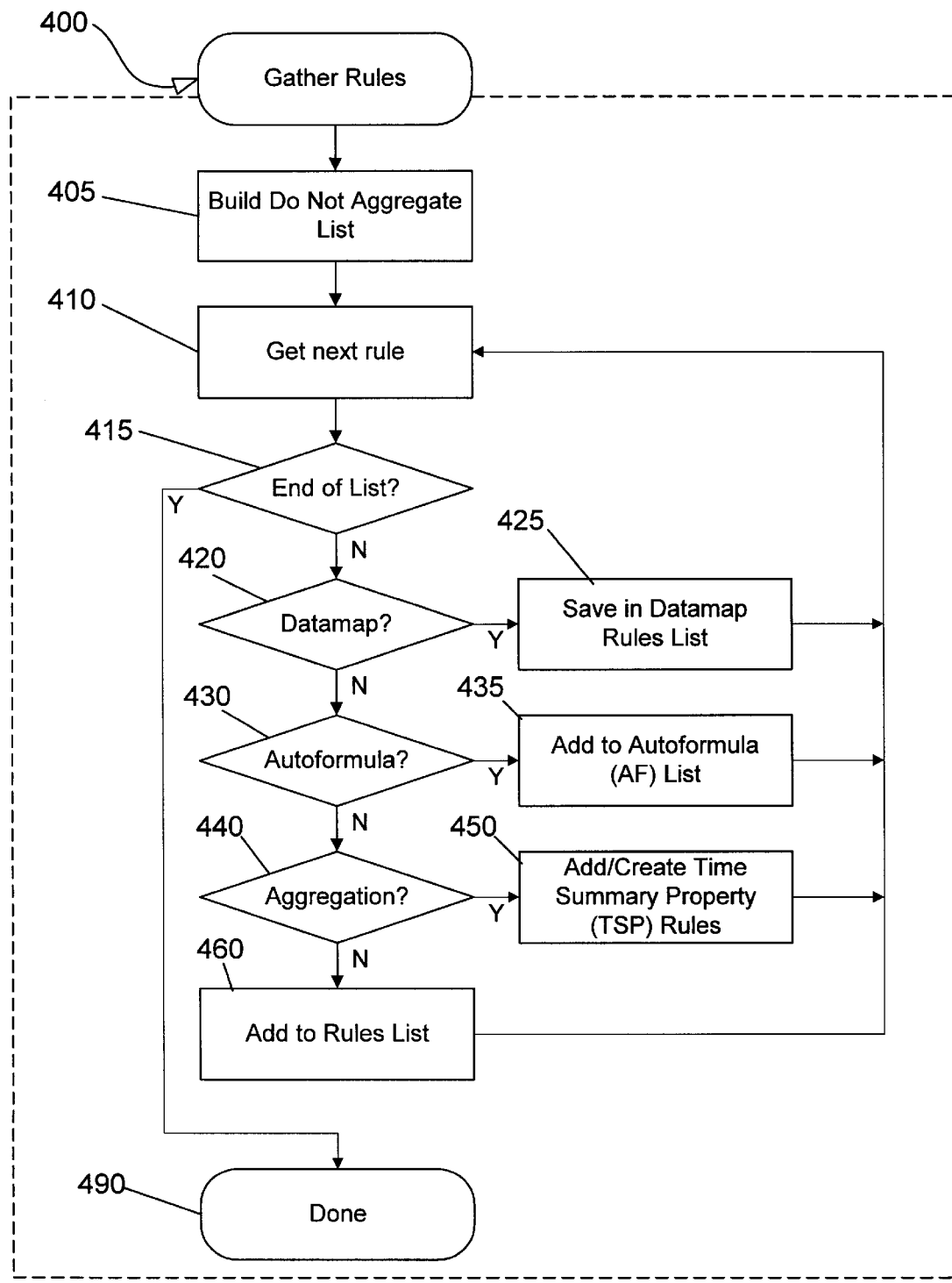
FIG. 10 shows the detailed steps involved in the process of gathering the rules.
Figure 11:
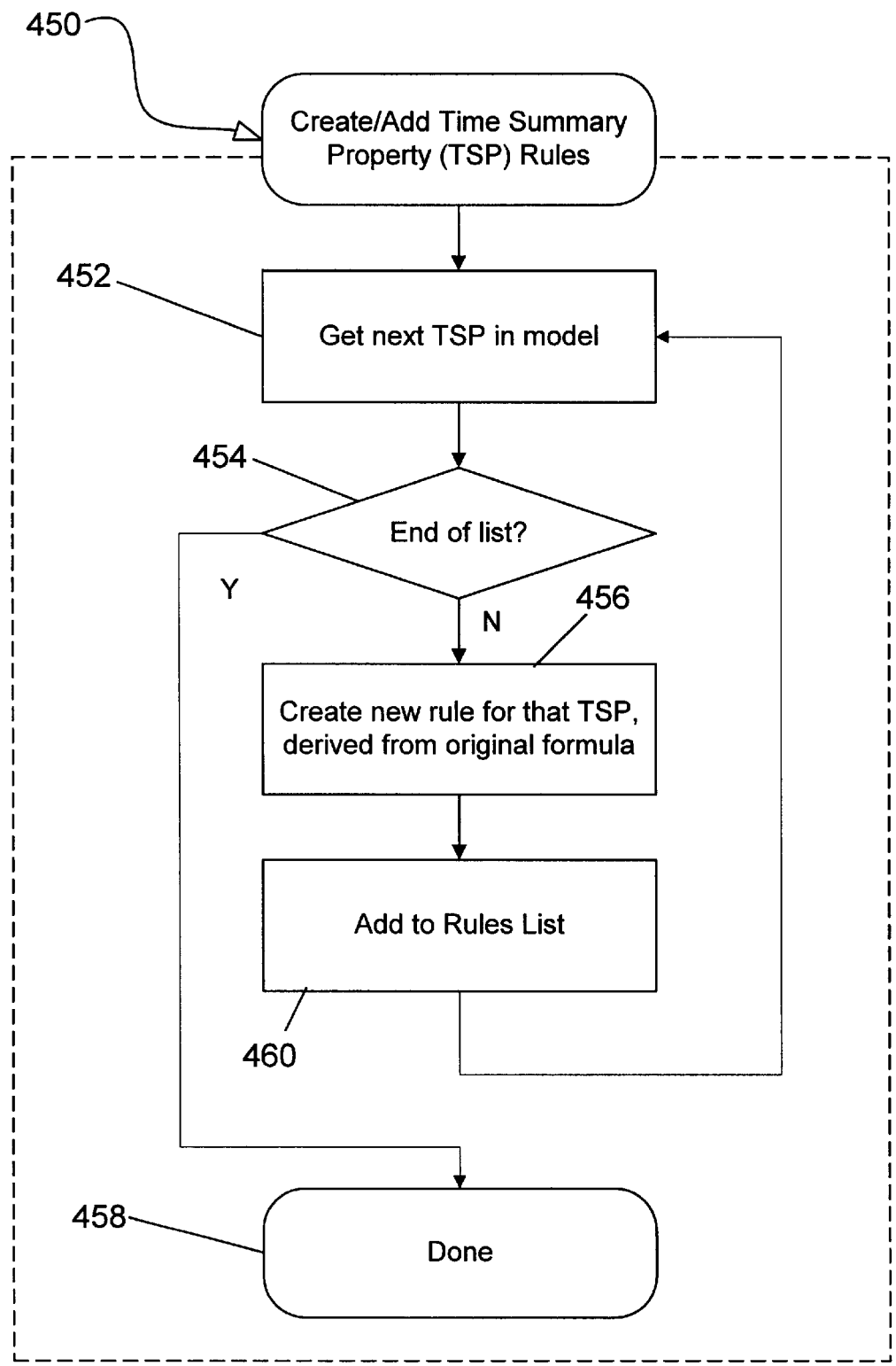
FIG. 11 shows the detailed steps involved in the subroutine for creating and adding the Time Summary Properties.
Figure 12:
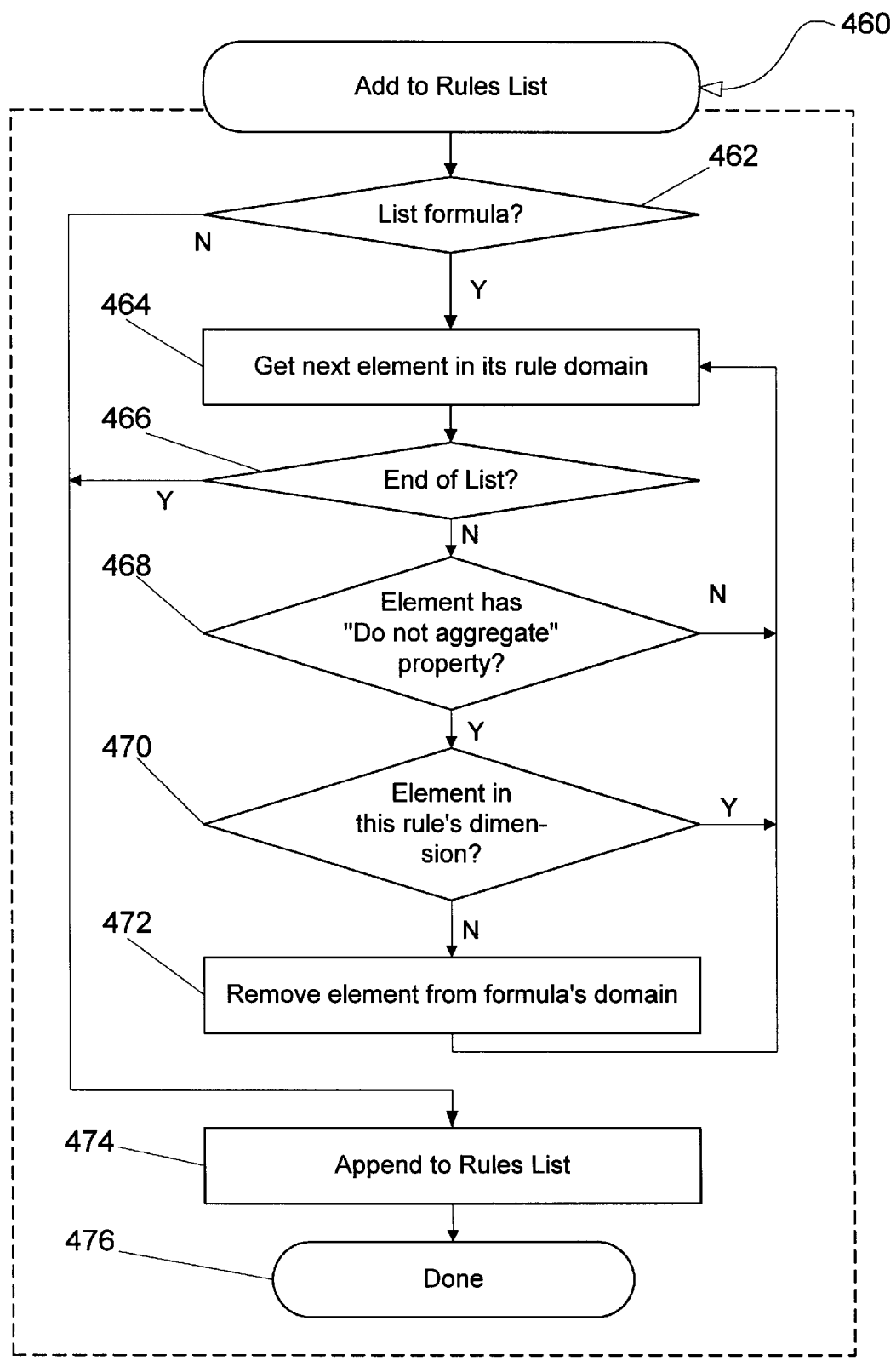
FIG. 12 shows the detailed steps involved in the subroutine for adding rules to the Rules List.

FIG. 10 shows the general step of gathering rules 400 in more detail. A list of rules having "Do Not Aggregate" properties is built 405. The next rule is fetched 410. If there are no more rules to fetch 415, the routine is done 490. If not, the rule is tested to see if it is a datamap 420, an autoformula 430, or an aggregation 440. Datamaps are saved in a Datamap List 425, autoformulas are added to an Autoformula List 435. If the rule is an aggregation, a subroutine to Add/Create Time Summary Properties (TSP) Rules 450 is called. The details of this subroutine are seen in FIG. 11, to be discussed below. If the rule is neither a datamap, autoformula or aggregation it is added to the Rules List 460 through another subroutine, details of which are seen in FIG. 12 below. The routine loops back to step 410 to get the next rule, and this loop is repeated until the last rule has been processed 415, at which time the routine is done 490.

The time summary property requires special support during Rule Gathering. Two inputs create these time summary rules: 1) list formulas in the time dimension that have their type set to Aggregate, and 2) elements that are not in the time dimension that specify a time summary property other than "None". The first of these inputs contains a rule domain and operands, but no operator; the second defines the operator (i.e. sum, avg, min, max, first, last). The two in combination form a complete rule. The Not Specified element (N/S) will have "None" for its time summary property. For every such pair where the element with the time summary property is within the rule domain of the aggregation formula, Domain Modeling Rule Set Preparation will create the rule and will adjust its rule domain to contain all the elements with the time summary property in that element's dimension. The other dimensions will remain unchanged.

FIG. 11 shows details of the Add/Create TSP Rules subroutine 450, which is called from various points in the whole program. The next TSP in the model is fetched 452. If there are no more TSPs 454, the subroutine is done 458. If not, a new rule is created for that TSP which is derived from the original formula 456 according to the procedure described in the paragraph above. Next, the subroutine is called to add it to the Rules List 460 (see FIG. 12). The program loops back to 452 to get the next TSP until all have been processed and the loop is done 458.

FIG. 12 illustrates details of the Add to Rules List subroutine 460, which is called from different points in the program. The rule is tested to see if it is a list formula 462. If not, it is appended to the Rules List 474 and the subroutine is done 476. If it is a list formula, the next element in its rule domain is fetched 464. If there are no more elements 466, the rule is appended to the Rules List 474. If not, the element is checked to see if it has a "Do Not Aggregate" property 468. If it does not, the next element is fetched 464. If it does, the element is checked to see if it is in the dimension of the element to which this rule is attached 470. If yes, the next element is gotten 464, if no, the element is removed from the formula's domain 472 and the next element is gotten 464. The subroutine is looped until each element has been checked 466, and then the rule is appended to the Rules List 474 and the routine is done 476.

Figure 13:
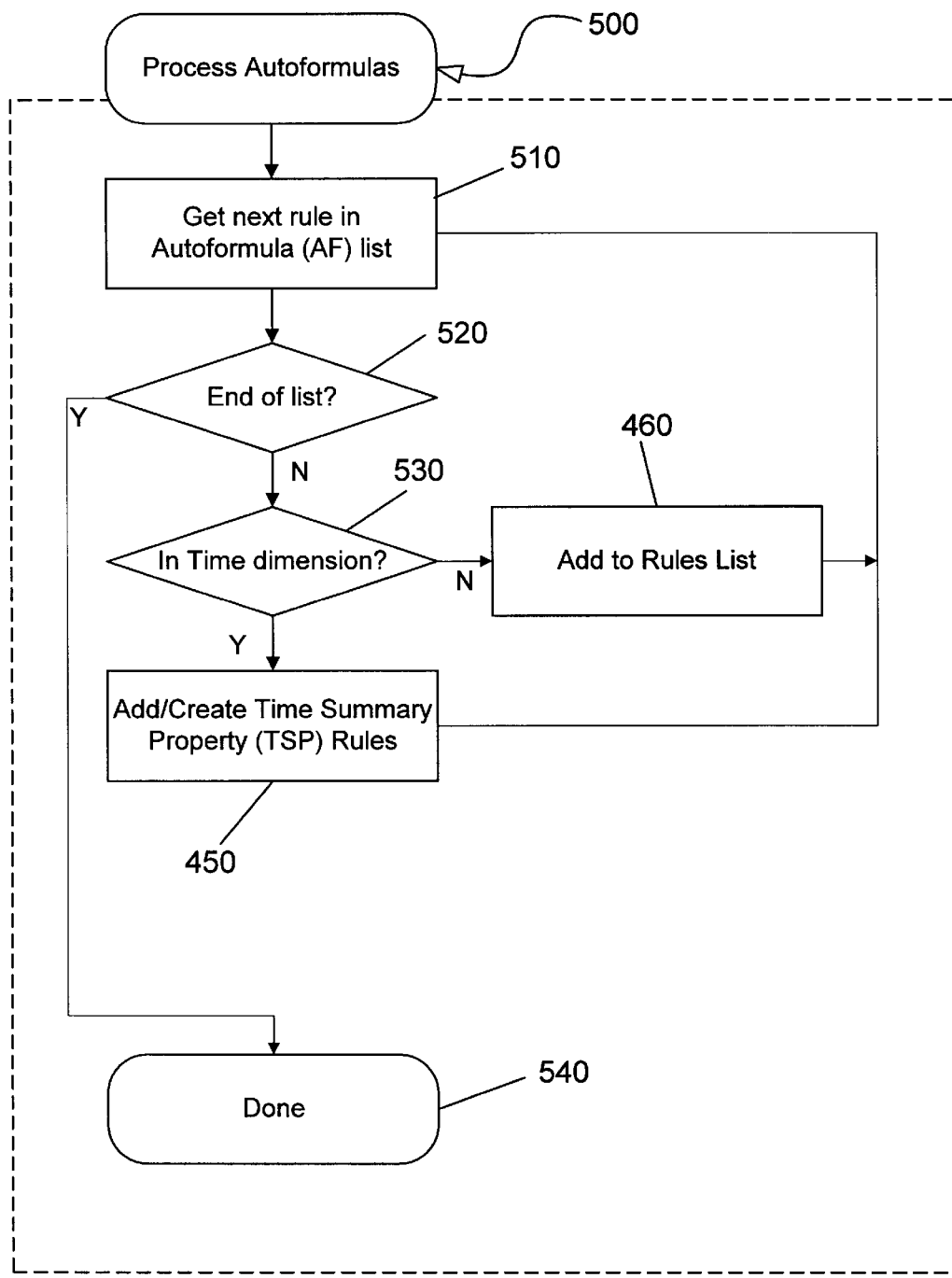
FIG. 13 shows the detailed steps involved in the processing of autoformulas.

FIG. 13 shows details of the general step of processing the autoformulas 500. The next rule in the Autoformula List is fetched 510. There is a test to see if the end of the list has been reached 520. If yes, the routine is done 540. If no, the rule is tested to see if it is in the Time dimension 530. If not, the rule is sent to the Add to Rules List subroutine 460. If the rule is in the Time Dimension, it is sent to the Add/Create TSP Rules subroutine 450. The routine loops back to get the next rule 510, until all rules are processed 520 and the routine is done 540.

Datamap rules are constructed from metric datamaps, qualifier datamaps, and model table rule domains supplied by the user. The metric datamap specifies the table, and column to be used. In addition, there are qualifier datamaps that can be used to select specific rows from the table containing the metric column.

Figure 14:
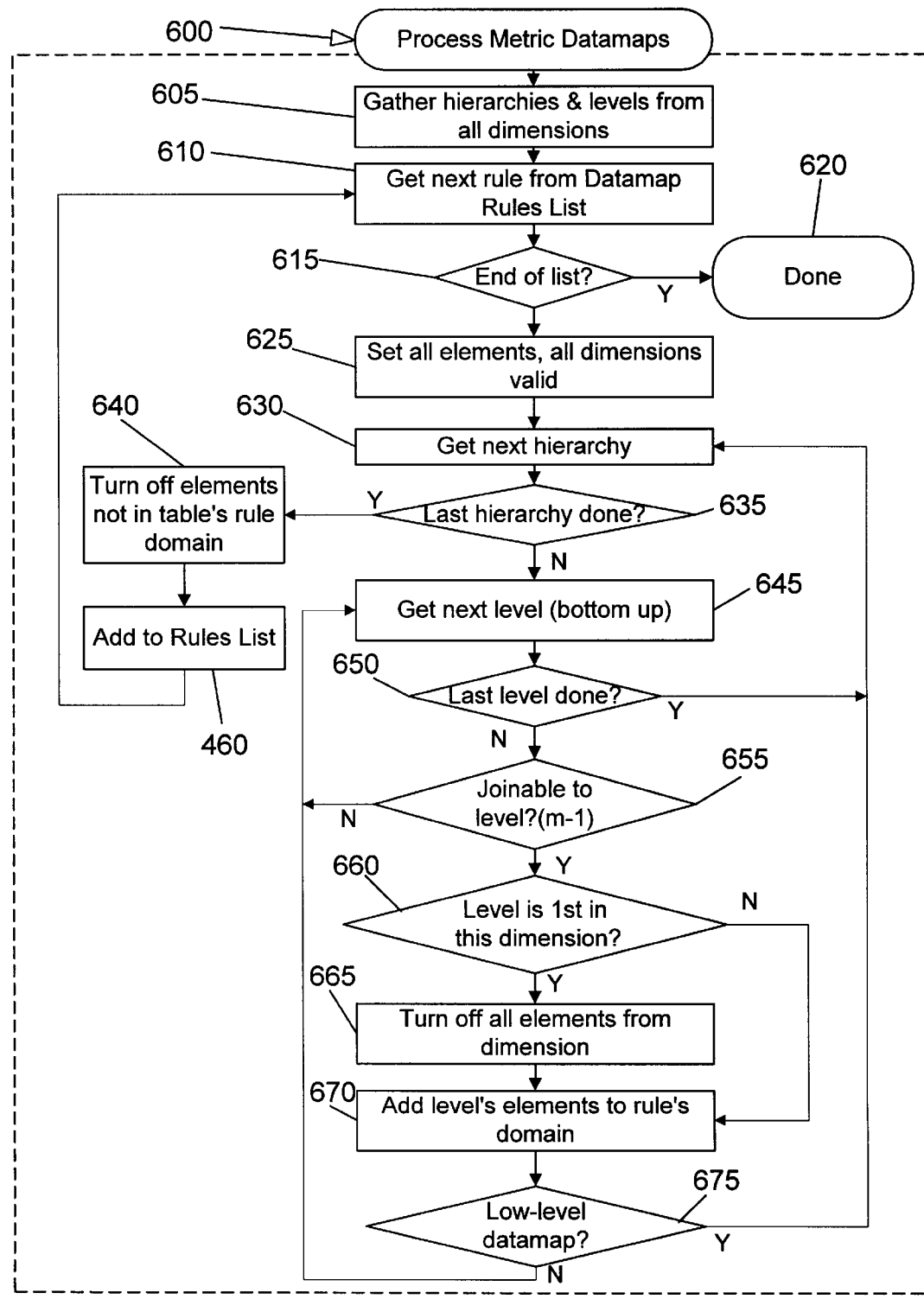
FIG. 14 shows the detailed steps involved in the processing of metric datamaps.

FIG. 14 illustrates details of the general processing of Metric Datamaps 600. Hierarchies and levels are gathered from all dimensions 605. The next rule is fetched from the Datamap Rules List 610, and checked to see if it is the end of the list 615. If so, the routine is done 620. If not, all elements and dimensions are set as valid for the current datamap 625. The next hierarchy is fetched 630 and checked to see if it is the last 635. If it is, the rule domain specified by the user for the metric datamap's table is accessed. Any elements not specified in the table rule domain are turned off for the datamap's rule 640, and the rule is added to the Rules List by the subroutine 460. If the hierarchy is not the last, the next level is fetched from the bottom level up 645 and tested to see if it is the last level 650. If so, the program loops back to get the next hierarchy 630. If not, the level is tested to see if the datamap's metric table is joinable to the previous level 655. If not, the next level is fetched 645, and if so, then the level is tested to see if this is the first level encountered in this dimension which is joinable 660. If not, the level's elements are added to the rule's domain 670. If so, all elements from the dimension are turned off 665 before adding the level's elements to the rule domain 670. If the rule has non-sum TSP or is marked "Do not aggregate" and is the lowest level of this hierarchy, then it is considered a low-level datamap 675 and the program loops back to get the next hierarchy 630. If not, the program loops back to get the next level 645. The routine repeats until the last datarnap rule has been processed 615 and the routine is done 620.

DOLAP allows a model to include more than one rule that computes the same cell in the data cube. If multiple rules can compute the same cell, DOLAP has to choose which rule to apply. The rule precedence scheme described below is based on the premise that database-mapping rules inherently have a lower priority than rules attached or specified for specific elements in the model. Another way of looking at this rule procedure scheme is that user entered model rules override the values that are stored in the database.

Model rules include UEVs and user entered formulas. Model level rules are prioritized first by their specificity, with highest specificity first, and lowest specificity last. Specificity is determined by the number of dimensions specified for the domain of the UEV or formula. For UEVs, the number of dimensions specified in the UEV address is the specificity. For formulas, specificity is the number of dimensions specified in the rule domain. If this formula is attached to an element, the dimension of the element is included as a specified dimension.

Within one group with similar specificity, the model rules are prioritized by their types. UEVs are first, followed by formulas. Formulas, including user entered formulas and autoformulas, are further broken down into high-priority and low-priority formulas. A lowpriority formula is defined as one that contains a single element with no operators, or a formula made up entirely of sum, +and – operators. All other formulas aformulas. Thus, the high-priority formulas. Thus, the order of precedence for model rules of equal specificity is UEVs, high-priority formulas, and low-priority formulas.

Database rules include database mapping rules and promoted and unpromoted autoformulas created for parent elements in dynamically generated hierarchies, since these represent aggregations that can be performed in the database. Database mapping rules take precedence over the unpromoted autoformulas to ensure that as much aggregating of values is done in the database as possible. The promoted autoformulas are given higher priority than the database mapping rules in cases where the user has specified a model level rule that overrides a value that would otherwise be taken from the database. Putting these items just above the database mapping rules will ensure that the program does not go to the database to get values, but rather, uses the autoformulas to get to the user entered value or rule.

The following outline summarizes how rules are sorted into priority groups.

Figure 15:
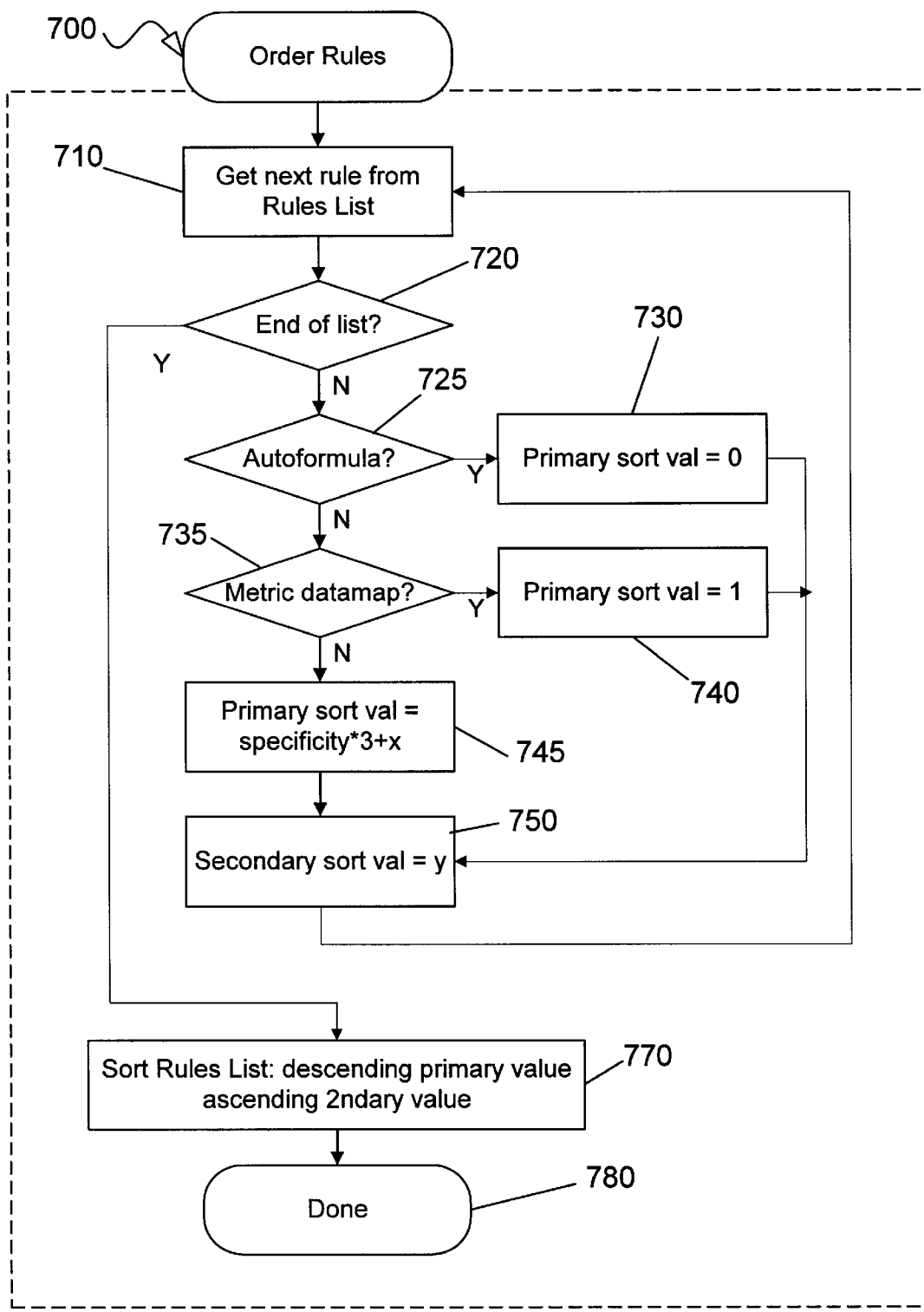
FIG. 15 shows the detailed steps involved in the process of ordering the rules.

Model Rules
   Specificity—highest
      UEVs
      High-priority formulas
      Low-priority formulas
      .
      . (each level of specificity repeats the pattern)
      .
   Specificity—lowest
   UEVs
   High-priority formulas
   Low-priority formulas
   Database Rules
   Promoted Autoformulas
   Datamap Rules
   Unpromoted Autoformulas FIG. 15 shows the details involved in the general step of ordering the rules 700. It will be understood that the method illustrated for ordering the rules is subject to considerable variation (for example, in the values assigned for primary and secondary sorting) and other methods of ordering the rules may be employed.

The next rule is fetched from the Rules List 710. If there are no more rules left 720, the Rules List is sorted 770, to be discussed below. If there are more rules, the rule is tested to see if it is an autoformula 725. If so, it is assigned a primary sort value of zero 730 and sent to be assigned a secondary sort value 750, to be discussed below. If the rule is not an autoformula, it is tested to see if it is a metric datamap 735. If so, it is assigned a primary sort value of one 740 and sent to be assigned a secondary sort value 750, to be discussed below. If the rule is not a metric datamap, the rule is assigned a primary sort value 745 equal to 3 times its specificity plus zero for a low priority rule type, plus one for a high priority rule type, or plus two for a User Entered Value. The rule is then assigned a secondary sort value 750 equal to "y", where y may be chosen from the following assignment scheme:

| Rule type | Characteristic | Value(s) |
| --- | --- | --- |
| UEV | (all formulas) | 1 |
| High Priority | (all formulas) | 1 |
| Low Priority | Non-sum operators | Dimension# |
|  | Sum operators | Dimension# + #dims in model |
| Datamap | (all formulas) | Row count |
| Auto formula | (all formulas) | Dimension# |

The routine loops back to get the next rule from the Rules List 710 until all rules are processed 720. The Rules List is then sorted with descending primary values and ascending secondary values 770. The routine is then done 780.

Even with the above structure, it is possible for two or more rules to end up in the same priority catagory. The following section describes how DOLAP resolves the situation for each of the lowest divisions.

High-priority formulas: Multiple high-priority formulas will yield a conflict. DOLAP will report this conflict. Users must resolve these conflicts with rule domains.

Low-priority formulas: This may or may not yield a conflict. The concept of commutative formula pairs is used to resolve conflicts. One definition used in a version of the present invention limits commutative formula pairs to those that sum their children, because such commutative formula pairs are mathematically guaranteed to produce equivalent results. Analysis of formula pairs resolves questions of which formula should be used and whether a conflict exists. Not all combinations of pairs need to be analyzed. The process can start with any two formulas and compare the "winner" with the next arbitrarily ordered formula, tossing away the "loser".

The results of a pair comparison will yield one of:

1. A true conflict. This occurs when the formulas are not commutative. There is no need to continue the analysis.

2. A "winner" is determined. This occurs when the formulas are commutative, and the formulas are associated with different dimensions. The winner is the formula whose dimension has higher priority, with higher priority being determined by which dimension appears first in the order of dimensions.

3. A commutative conflict. This occurs when the formulas are commutative, but are associated with the same dimension. If this occurs on the last pair of rules to be compared, a conflict will result. If there are more rules remaining to be compared, the scanning will continue in the hope of finding a new "winner", that is a commutative rule with a dimension with higher priority. If none is found, the conflict condition will result.

For prioritizing datamap rules, when multiple datamap rules are available, the DOLAP server will prioritize them according to the last known row count that each table is known to have. The smaller the number of rows in the table, the higher priority the rule has. If two tables have the same row count, RSP will prioritize the two arbitrarily, and that order will hold consistently for as long as that version of the prepared rules are used.

For prioritizing promoted/unpromoted autoformulas, if there is more than one, the program will choose first the time dimension formula if there is one. This is to ensure that time summary properties that are not summed will be computed first, leaving a query that can be aggregated in the database. If there is no time dimension formula, the program will choose from the other dimensions by dimension priority, with the first dimension being the highest priority. No conflicts are possible, because there can be at most one formula associated with each dimension.

The precedence determination scheme described above requires that the program will promote autoformula rules to be model level rules when any of their inputs derive from model level rules. This ensures that when a model level rule, like a UEV, is entered at a given level, the autoformulas that can sum that cell will take precedence over rules that retrieve data from the database. Thus, the datamap rules for intermediate levels will not be used, and the sum that will include the model rule (UEV in this case) will be used.

When the autoformula is promoted, only the parts of the rule domains that are affected by the model rules will be included with the promoted autoformula. The remaining parts of rule domain will remain with the unpromoted autoformula.

The procedure to promote the rules is as follows:

1. Split all the rules into two groups: model rules (UEVs and formulae) and DB rules (datamap rules and autoformula rules). The rules from the first group have higher priority than rules in the second group.

2. For each model rule that can provide a value to an operand of an autoformula rule, find a sub-domain of the autoformula rule that it computes and move this portion of the autoformula rule into the promoted autoformula rules group and repeat the process.

Figure 16:
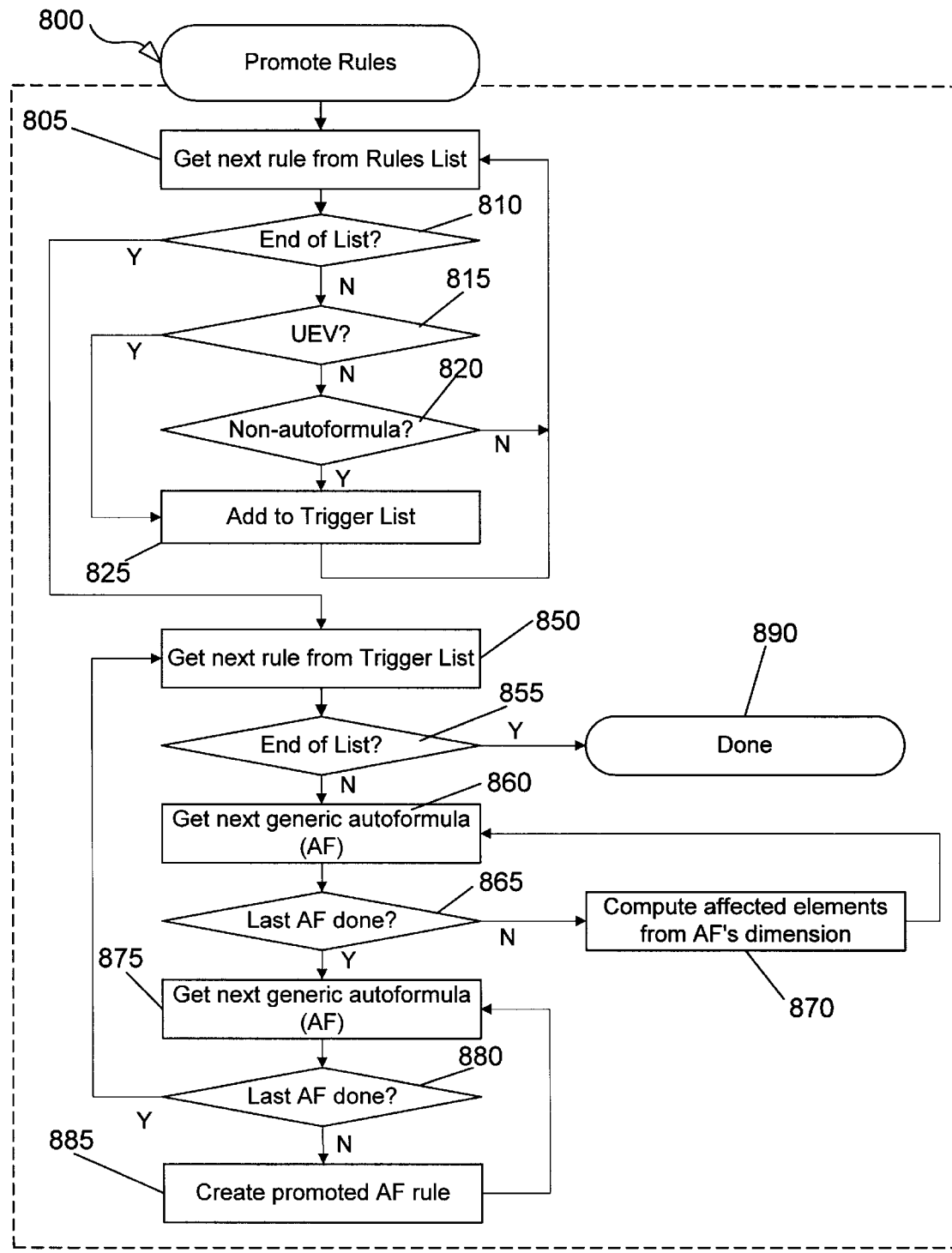
FIG. 16 shows the detailed steps involved in the process of promoting the rules.

FIG. 16 illustrates the detailed steps involved in the general step of promoting rules 800. The next rule is fetched from the Rules List 805. If there are no more rules to process, the routine branches down to step 850, to be discussed below. If it is not the last rule, it is tested to see if it is a User Entered Value 815 or a non-autoformula 820. If it is either of these, the rule is added to the Trigger List 825. If it is neither, the routine loops back to get the next rule 805. When the last rule has been processed, the routine switches to the Trigger List and fetches the next rule from the Trigger List 850. If there are no more 855, the routine is done 890. If not, the next generic autoformula in the Autoformula List is fetched 860. There is a test to see if there are no more autoformulas 865. If the next generic autoformula was not the last, the elements which could be computed directly or indirectly from the rule from the Trigger list are computed from the autoformula's dimension 870, and the routine loops back to get the next autoformula 860. If the end of the autoformula list has been reached 865, the autoformula list is started over by fetching the next autoformula 875, which is then checked for the end of the list 880. If the end of the autoformula list has not been reached, a promoted autoformula rule is created 885, where its rule domain equals the Trigger Rule's elements from the autoformula dimension plus the Trigger Rule's elements and the affected elements from all dimensions. The routine loops to get the next autoformula 875 until the end of the list is reached 880 and the routine then loops back to get the next Trigger rule 850 until the end of this list is reached 855 and the routine is done 890.

It is possible and likely that in the process of building a model, the user will define rules and datamaps which result in conflicting rules. Conflicts may be handled in the following manner:

1) Domain Modeling Rule Set Preparation will create "transient" formulas, with properties available to the client as follows:

the two rules that conflicted, the time summary property for each (if needed).

2) When the server dumps prepared rules in response to appropriate model changes, the transient formulas will also be invalidated.

3) Because of 2), the client application must cache all rule conflict data locally, since the data could be invalid later on.

4) An API returns conflict pairs of formulas, eliminating duplicate pairs. No rule domain info is returned; the client will presumably retrieve the original rule domains from the model using the handles provided, sometimes indirectly, (cf 5, below), where the handle to the metric table would have to be searched for in the models' table datamaps, to find the rule domain attached to the table. 5) Datamap conflict rules return a handle to the associated metric table.

Figure 17:
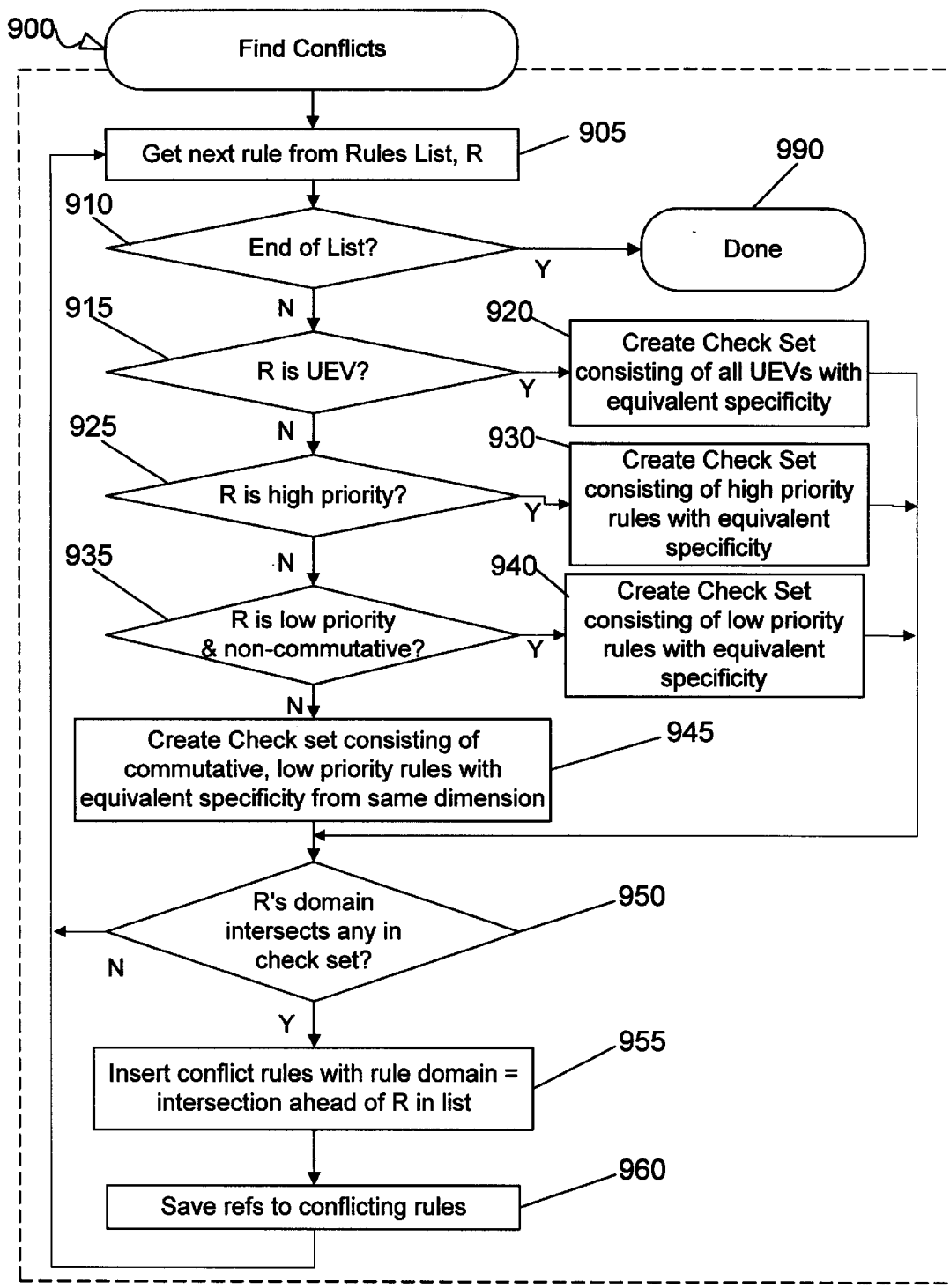
FIG. 17 shows the detailed steps involved in the processing of rule conflicts.

FIG. 17 shows the detailed steps involved in the general step of resolving conflicts 900. The next rule is fetched from the Rules List 905, and there is a test for the end of the list 910. If so, the routine is done 990. If not, the rule is tested to see if it is a User Entered Value (UEV) 915. If so, a check set consisting of all UEVs with equivalent specificity is created 920 and the routine branches to step 950, to be discussed below. If not a UEV, the rule is checked for high priority 925. If so, a check set of high priority rules with equivalent specificity is created 930, and then the routine goes to step 950, to be discussed below. If not a high priority rule, it is tested for low priority and non-commutative properties 935. If it is a low priority rule with non-commutative properties, a check set of low priority rules with equivalent specificity is created 940, and the routine goes to step 950, below. If the rule is not both low priority and non-commutative, a check set of commutative low priority rules with equivalent specificity from the same dimension is created 945. The routine then goes to step 950, referred to above, which does a pairwise comparison of all the rules in the set. For each pair with intersecting rule domains, a conflict rule with the rule domain equal to the intersection with the set is inserted ahead of the rule in the Rules List 955. The references to the conflicting rules are then saved 960. The routine then loops back to fetch the next rule 905. The routine continues until the last rule has been processed 910 and the routine is done 990.

In order for the user, who may not have an extensive background in computer programming, to see how the value contained in a particular cell is calculated, DOLAP 10 is equipped with a graphic user interface called the Cell Explorer. The Cell Explorer enables the user to explore values in a model's data cube 52 easily without the distraction of non-essential values that are usually visible in a worksheet. It is also useful for correcting errors in the model 50 in later stages of development. The Cell Explorer is available from the Tools |Cell Explorer menu command whenever the Modeler's Workbench or a Worksheet is the active window.

The Cell Explorer gives the user a way of exploring the calculation process of a particular cell 56 from the model's datacube 52. This is similar to having a one-cell worksheet. In addition to seeing the value for the data cell 56 and the rule that was used to calculate the cell 56, the Cell Explorer also enables the user to view the source and parent elements for selected elements that make up the data cell's 56 address. In addition, like worksheets, the user can display the SQL Audit window to view the SQL queries generated by the Cell Explorer.

The user can open multiple Cell Explorers by repeatedly using the Tools | Cell Explorer menu item from the Modeler's Workbench or from a worksheet. When the user opens the Cell Explorer from the Modeler's Workbench, the data cell 56 of interest is determined by using the default element of each dimension 54 in the model 50. If the user has not assigned a default element for a dimension 54, Cell Explorer will use the first element 58 in the dimension 54. When opened from a worksheet, the Cell Explorer uses the currently selected worksheet cell. If the worksheet has no elements 58 in it (e.g. has just been created) and is the active window, the Cell Explorer command is disabled.

The Cell Explorer can be closed by using the File | Close menu command or the close box in the upper right-hand corner of the window. The user can also minimize, maximize, and restore the window using the appropriate window boxes. While the Cell Explorer is minimized, it will continue to recompute the data cell 56 and sources values if the auto-recalc mode is turned on.

To obtain the value of the data cell and source cells, the Cell Explorer makes a query to the DOLAP server. If the window's auto-recalc setting is on, a query will be made whenever the focus cell is changed, the model 50 changes, or a UEV 96 is changed. Otherwise, clicking the Recalc button on the toolbar will cause the query. While the query is in progress, a modal dialog will be presented allowing the user to cancel the query before it finishes, if desired. If the query is cancelled, the Cell explorer's auto-recalc setting will be changed to OFF. If appropriate model changes have been made, or if this is the first query to the model, the DOLAP server will prepare the model's rules, and a message to that effect will appear in the progress dialog.

The Cell Explorer window is divided into an upper pane and a lower pane within a resizable window divided by a user-adjustable splitter bar. The top pane displays information for the data cell of interest. Stacked vertically in the middle of the pane are tiles/buttons representing the address of the focus cell. The top button contains an edit text control with the value of the focus cell (assuming its value is being computed - see below). One of these buttons will be selected. On the left hand side is a stack of buttons representing the children of the selected center-column element. Clicking on one of the center buttons causes that element's children to be displayed on the left hand side. The right hand column contains a similar stack of buttons representing the parents of the element selected in the center column, and clicking one of the center buttons updates the right hand column as well. The buttons in the left and right hand columns each contain a static text which contains the value of the cell represented by substituting that element into the cell address of the center column. A vertical scroll bar appears for the top pane if all the element buttons will not fit in the pane, so the user can scroll up/down to bring desired element buttons into view.

The lower pane of the window contains three checkboxes, indicating whether or not the cell values for the child cell(s), focus cell, and parent cell(s) should be queried for and displayed, allowing a user who is just navigating to do so without waiting for the server to compute those values. This pane also displays the name and expression for the rule used to compute the data cell's value. (Note that this rule will not necessarily refer to the elements in the Sources list.) The contents of this field will be the same as if this cell is selected in a worksheet. Typing into the focus cell's value field adds a User Entered Value (UEV) 96 to the model 50 or replaces the one already defined for that cell 56. The values for the focus cell and sources cells will be formatted according to the formatting specified for the element from the Time Summary Property dimension of the model. The lower pane also contains a field containing the model builder's description of the element selected in the central column.

The left column, titled "Sources", contains the list of the children elements for the selected data cell address element. Values for the cell's address by child element are also displayed.

The top item of the center column displays the data cell's computed value. If the cell returns an error, "Error" will be displayed in the value. Also, the display shows the data cell's address as a list of the elements (buttons) that make up the cell address. Elements which have children are displayed with an arrow icon to the left of the element's name. Elements that are used by other elements (parent elements) are displayed with an arrow icon to the right of the element's name.

The right column, titled "Uses", shows the elements whose values can be computed from the selected data cell address element.

When the Cell Explorer is first opened, a data cell address is already specified. However, the user can change the data cell by modifying the elements in the data cell address portion of the window. The address of UEVs entered in the Cell Explorer is specified in the same number of dimensions as the Cell Explorer itself, with all other dimensions wild-carded.

To specify a data cell, the following operations may be performed: To use a Source or Uses element:

1. Select a data cell address element by depressing the button.
2. If Source or Uses elements are available, they are displayed in their respective lists.
3. Double-click on a Source or Uses element. Cell Explorer replaces the currently selected data cell address element with the Source or Uses element. The data cell's value is then queried for and displayed and the new rule is displayed, according to the window's auto-recalc setting.

To add address elements:

1. Drag an element from the Modeler's Workbench or the worksheet and drop it on the data cell address portion of the window. The user can also paste an element from the clipboard. If the dimension for the new element is already referenced in the data cell address, the new element replaces the existing element for that dimension. If the dimension is not currently referenced, the new element is added to the address.
2. The data cell's value is recomputed and the new rule is displayed, according to the window's auto-recalc setting.

To delete address elements:

1. Select an element in the data cell address.
2. Press the Del key or use the Edit | Delete menu command.
3. The data cell's value is recomputed and the new rule is displayed, according to the window's auto-recalc setting. Note that since deleting an element also removes the dimension the element belongs to, the dimensionality of the data cell is reduced.

Hyperstructure Query Language (HQL) is used for querying the DOLAP system for data. It is a data manipulation language only, not a data definition language. Data definition is accomplished via the DOLAP Application Programming Interface. HQL is a "technical language", like SQL. HQL queries will usually be created automatically by software, by the DOLAP Client Application Worksheet or 3rd party report generators. Like SQL, HQL may be used in a simplistic manner by naive users, in a more sophisticated manner by power users, and in its full power and complexity only by experts.

A query expressed in HQL, the Hyperstructure Query Language, is sent to the DOLAP Server for an open DOLAP model. Queries fetch cell values from the datacube, fetch lists of qualifying elements (optionally with their selected attribute values), or fetch lists of unique attribute values. Model metadata is retrieved using the API, not queries. Query processing can take place in both the DOLAP Server and the database server, depending on the amount of optimization that DOLAP can achieve. Every effort is made to "push" computation into the database server, to take advantage of its computational power and to decrease bandwidth demands on the network hosting the DOLAP and database servers.

Query language supports grouping operator: ().

The DOLAP Client interprets quotes in HQL and custom formulas as follows: two adjacent double quotes translates to one double quote as part of an element name; a double quote not adjacent to another double quote is treated as a grouping operator.

When elements in different dimensions have the same name, then the user must disambiguate them using the syntax <dimension-name>.<element-name>

Numeric constants and string constants may be used in query specifications.

It can support "cutoff" type element query functions: <element-list>WHERE "TOP" or "BOTTOM"<integer>

Elements are disambiguated by <dimension-name>.<element-name>Query language includes structural element query function: ChildrenOf, returns elements in the order defined by the element hierarchy, except for TDE's.

Query language includes structural element query function: DescendantsOf.

Query language includes structural element query function: LeavesOf.

Query language includes structural element query function: ParentsOf (INDENT?)

Query language includes structural element query function: ParentOf.

Query language includes structural element query function: RootsOf

Query language includes structural element query function: AncestorsOf.

Supported decimal separators are periods.

Supported list separators are commas.

A query for ChildenOf(dimension) will return the root elements of the dimension in the order they appear in the MWB.

Element attribute comparisons are by default case sensitive, for search and sorts.

Support element with (list of) attribute(s) and value(s) query.

The result of a metric comparison between a cell value and a multi-dimensional tuple is true if at least one of the individual comparisons is true.

Interpretation of the following items is case-insensitive: logical database name, model names, worksheet names, info space names, BLOB names, dimension names, level names, element names, attribute names, HQL keywords, custom function names, and custom formula keywords.

HQL supports UPPER and LOWER functions applied to attributes in WHERE and ORDER BY clauses; this enables case-insensitive attribute sorts and comparisons.

The user can query by element name for transients by using the "name" attribute

Numeric sort: nulls and errors ordered first for ascending sorts and last for descending sorts, sub-sorted by internal error numbers assigned String sort: nulls will be sorted first for string comparisons for ascending sorts and last for descending sorts.

HQL is used by any application (Sybase or 3rd party) via the DOLAP API. In the DOLAP Client Application, HQL may be visible in error log file entries, the IHQL Window and the SQL Audit window. The Hyperstructure Query Language, HQL, is how a request for such data is expressed.

There is one "entry point" to the Query Language Grammar. This is the symbol query in the language grammar below. There are four variants of a query:
 cell-query (yields cells labeled with elements)
 element-query (yields a list of elements from a dimension)
 element-attribute-value-query(yields a list of elements and one or more attribute values for each)
 attribute-value-query (yields a list of unique attribute values). Most queries are cell-queries, since DOLAP is most often used to analyze the numbers in the multidimensional datacube described by a model. The DOLAP Client Application Worksheet generates cell-queries to retrieve the numbers it displays. Element, element-attribute-value, and attribute-value queries will typically be used by third party metadata exploration tools such as the so-called "knock-down browser". The attribute mechanism allows searching the element space (the DOLAP metadata) by relational data available in the SQL Database only.

The most common use of element, element-attribute-value, and attribute-value queries is as sub-queries embedded within a cell query, generally created and issued programmatically through the DOLAP API by 3rd party client applications.

Queries involving transient dynamic elements (TDEs) are specified and processed just like those involving non-TDEs, except that:
 1. TDEs cannot be specified by name in ElementSelects.
 2. They cannot be queried for directly using an element query. This can be accomplished by specifying a "name" attribute for the transient level of the dynamic hierarchy, associating it with the same column that specifies the name for the TDEs, and using an element-attribute-value query.
 3. Results will not be cached.

Grammar for HQL (Extended Backus-Naur Form)
Basic Blocks
Literals: integers, numbers including standard scientific notation, string constants, which are any sequence of characters in single quotes, dates, and identifiers, which can be either a regular identifier which starts with a letter, or a delimited identifier which is any sequence of characters enclosed in double quotes.
Additionally, there are the following keywords:

| ANCESTORS OF | AND | ASCENDING ATTRIBUTE |
| ATTRIBUTES | | |
| BOTTOM | BY | |
| CELL CHILDREN OF | | |
| DESCENDANTS OF | DESCENDING | DISTINCT |
| ELEMENT NAME | ERROR | |
| FROM | | |
| INVALID REFERENCE | | |
| LEAVES OF | LEVEL | LOWER |
| MATH ERROR | NOT | NULL |
| ONLY OR | ORDER | ORDERED |
| PARENT OF | PARENTS OF | |
| ROOTS OF | RULE CONFLICT | RULE MISSING |
| SELECT | | |
| TOP | | |
| UPPER | USER DEFINED ERROR | |
| WHERE | WITH | |

Keywords are case-insensitive
Whitespace (any sequence of spaces, tabs, carriage returns, line feeds, and/or form feeds) is ignored except within string constants or quoted identifiers.

Referencing Elements, Dimensions, Levels and Attributes
 A dimension is just an identifier:
 Dimension:
  Identifier
 An element reference is either an element name alone, or an element name together with the dimension name, in the form <dimension-name>.<element-name>. This form must be used when the same element name is used in multiple dimensions, where the parser cannot otherwise determine the dimension of an element.
Element
 ElementName
 Dimension. ElementName
ElementName
 Identifier
A level reference is either a name, or a name qualified with a dimension reference:
LevelRef.
 LevelName
 Dimension . LevelName
LevelName
 Identifier
An attribute name is just a name
AttributeName
 Identifier
Query Types
HQL allows four different query types
 Query:
  Cell Query
  Element Query
  ElementPlusAttributesQuery
  AttributeQuery
Cell Queries
 Cell Query returns the cells specified by a cells list. A single query can consist of multiple cell specifications. Each cell query specification defines a tuple domain.
CellQuery
 SELECT TupleDomain
TupleDomain
 Tuple
 ( TupleList)
TupleList
 Tuple
 TupleList, Tuple
Note that the list of tuples is enclosed in parentheses, that is, parentheses are optional when there is one tuple, but are required when there is more than one. Tuple:
 A tuple is a |—separated list of element selections, enclosed in square brackets: In this version of the preferred embodiment, each element selection within a tuple must be from a different dimension than any of the others.
Tuple
 [DimensionSelectList]
DimensionSelectList
 ElementsSelectList
 DimensionSelectList | ElementsSelectList
Element Queries
 An element query returns a list of elements.
 ElementQuery
  SELECT ElementsSelectList
 ElementsSelectList
  ElementsSelect
  ElementsSelectList, ElementsSelect

Elements Selection

An elements selection is defined by the elements bounding list specification, an optional filtering criteria, and an optional ordering criteria. The elements must all be from the same dimension. The parser must be able to determine the dimension of the first element reference unambiguously, or an error will result. Thereafter, all element references are assumed to be from that dimension. So, in a model with both BillTo and ShipTo dimensions, in the expression ShipTo.Boston, Chicago, New York, it's assumed that Chicago and New York refer to elements in the ShipTo dimension. Should either of them not exist in that dimension, an error would result.

ElementsSelect

ElementBoundingList Element Where(opt) ElementOrder(opt) If no element survives the ElementWhere filtering specification, an empty list is returned.

Elements Bounding List

The elements bounding list specifies the set of elements from which a smaller subset is going to be filtered. It can be an element name, a function, an element selection in parentheses, or a level specification.

ElementBoundingList
      Element
      ElementFunction
      Dimension
      ( ElementsSelect)
      LEVEL LevelRef Element functions are as follows ElementFunction:
      ElementFuncChildren
      ElementFuncParentsn
      ElementFuncDescendants
      ElementFuncAncestorsn
      ElementFuncLeavesn
      ElementFuncRootsn
      [ElementFuncRelevantChildren-removed for Release 1]
    ElementFuncChildren:
      ChildrenOf (LevelNumber(opt) ElementListOrDimension)
    ElementFuncParents:
      ParentsOf (LevelNumber(opt) ElementsSelectList)
    ElementFuncDescendants:
      DescendantsOf (LevelNumber(opt) ElementListOrDimension)
    ElementFuncAncestors:
      AncestorsOf (LevelNumber(opt) ElementsSelectList)
    ElementFuncLeaves:
      LeavesOf ( ElementListOrDimension)
    ElementFuncRoots:
      RootsOf ( ElementSelectList)
    [ElementFuncRelevantChildren
      RelevantChildrenOf (ElementListOrDimension, Tuple)
    LevelNumber:
      integer, ElementListOrDimension is a non-terminal symbol standing for either a list of elements or a dimension. It will require semantic analysis (there can be either a list of elements or a single dimension name, and these cases cannot be distinguished syntactically, and a single element can be either dimension name or an element name):

ElementListOrDimension
    Dimension
    ElementsSelectList

In this version of the preferred embodiment, all the elements must belong to the same dimension.

In this version of the preferred embodiment, a dimension name cannot be combined with an element list.

Element Selection Criteria

An element selection criteria is either a Boolean expression or a ranking function.

Element Where:

WHERE ElementWhereExpr
    WHERE ElementWhereRank

Ranking function

Analogous to the corresponding SQL function.

ElementWhereRank
    TOP integer BY Tuple
    BOTTOM integer BY Tuple

Semantics

Each element from the bounding list is concatenated with Tuple to form a cell address. The array of the values obtained this way is sorted, and the elements that correspond to the <integer>top/bottom values are returned. Null and error elements are never considered for selection.

Note that the number of returned elements can be more than <integer> (if there are multiple elements in a list with the same value for the examined cell), the number of returned elements may be less than <integer> (there are not enough elements in a list) and duplicate elements are carried over to the returned list In this preferred embodiment, the tuple cannot contain any element in the queried dimension.

In this preferred embodiment, the tuple has to contain exactly one element in each of the dimensions specified in it.

Element Selection By Expression

This is a logical expression, with elementary factors of the following kinds:

cell value comparisons and range
    attribute value comparisons
    element name comparisons In this preferred embodiment, it is not possible to compare a cell value with an attribute value.

ElementwhereExpr
    ElementWhereTerm
    ElementWhereExpr OR ElementWhereTerm
Element WhereTerm
    ElementWhereFactor
    Element WhereTerm AND Element WhereFactor
Element WhereFactor
    NOT(Opt) ElementWhereTest
Element WhereTest
    ElementWherePrimary
    (Element hereExpr)
ElementWherePrimary
    Element Where ValueComp
    ATTRIBUTE ElementWhereAttributeComp Note that since an ElementWhereExpr can be embedded in another ElementWhereExpr, and since both element queries and cell queries are building blocks for a ElementWhereExpr, it is therefore possible to embed a cell query inside an element query, or an element query inside another element query.

Semantics: When a tuple is being compared to a number, the cells whose values will be compared to the number are identified by concatenating the tuple with each element in the bounding list. If two tuples are being compared, the actual tuples to be compared are constructed by concatenating each tuple with each element from the bounding list. At least one of the resulting tuples must then evaluate to a single cell for each element from the bounding list.
Element Where ValueComp
   Tuple OpCompare Number
   Number OpCompare Tuple
   Tuple OpCompare Tuple
   Tuple IS NOT(Opt) NULL
   Tuple IS NOT(Opt) ERROR
   Tuple IS NOT(Opt) RULEMISSING
   Tuple IS NOT(Opt) RULECONFLICT
   Tuple IS NOT(Opt) MATHERROR
   Tuple IS NOT(Opt) INVALIDREFERENCE
   Tuple IS NOT(Opt) USERDEFINEDERROR
OpCompare
   <
   <=
   >
   >=
   =
   <>

In this version of the preferred embodiment, the tuple reference in a comparison expression cannot contain anything in the bounding list dimension.

Note that if we need to choose the elements for which all the vector components satisfy the condition, this can be achieved by prepending NOT to the negated condition:
SELECT ChildrenOf(All Customers) WHERE

[Sales | "1994" | ChildrenOf(All Products) ]>5000 returns the list of the customers who bought more than $5000 worth of any product in 1994, whereas
SELECT ChildrenOf(All Customers) WHERE NOT ([Sales |"1994"|ChildrenOf(All Products)]<=5000)

returns the list of the customers who bought more than $5000 worth of every product.

Attribute Value Comparisons
   ElementWhereAttributeComp
      AttributeRef OpCompare AttributeLiteral
      AttributeLiteral Op Compare AttributeRef
      [AttributeRef LIKE RegularExpression—removed for R1]
      [AttributeRef IN (AttributeLiteralList)—removedfor R1]
   AttributeRef
      LevelName.AttributeName
      UPPER (LevelName.AttributeName)
      LOWER (LevelName.AttributeName)
UPPER and LOWER are used in WHERE and ORDER BY clauses to enable case-insensitive attribute sorts and comparisons. Otherwise sorts and comparisons are case-sensitive.
   AttributeLiteral
   Number
   String
   Date
   NULL
Two attributes cannot be compared to each other.

In this version of the preferred embodiment, only one level may be specified in a where clause. All elements that are not part of that level are rejected.

Element Ordering
   Elements can be ordered in the following ways:
   by the cell values and/or attribute values
   by element name
   according to their order in the Elements Bounding List
ElementOrder
   ORDER BY ElementOrderByNameCellOrAttribute OrderDirection(opt)
ElementOrderByNameCellOrAttribute
   ELEMENTNAME
   Tuple
   ATTRIBUTE AttributeRef
OrderDirection
   ASCENDING
   DESCENDING
The elements can be ordered either in ascending or descending order. The default order is ASCENDING. If there is no sorting specification, then the order is determined by the order of the elements in the bounding list. Semantics: The specified tuple must have a single element in each specified dimension. The bounding dimension can not be specified.

Element-Attribute Queries
An element attribute query returns a list of elements and one or more attribute(s) for each.
ElementPlusAttributeQuery
   SELECT ElementsSelect WITH ATTRIBUTES AttributeNameList AttrOrder(opt)
AttributeNameList
   LevelName.AttributeName
   AttributeNameList, LevelName.AttributeName
AttrOrder
   ORDER BY AttributeRejList OrderDirection(opt)
AttributeRefList
   AttributeRef
   AttributeRefList, AttributeRef Elements from the element select list which do not have the specified attributes will be filtered out of the returned list (as opposed to return a NULL value for the attribute(s)).

Attribute Queries
An attribute query returns a list of unique attribute values.
AttributeQuery
   SELECT DISTINCT ATTRIBUTE Attribute FROM ElementsSelect AttrOrdered(opt) Note that elements in the ElementsSelect list which do not have the specified attribute will be filtered out of the results.
Attribute:
   LevelRef. AttributeName
AttrOrdered
   ATTRIBUTE ORDER OrderDirection
In this version of the preferred embodiment, the AttributeRef can only refer to the Attribute that is being selected.
In this version of the preferred embodiment, the LevelRef in AttributeQueries must contain the dimension.

Other features of the DOLAP system include an Interactive Hyperstructure Query Language facility, which enables the user to submit queries against a model and view the results without using a worksheet. It is an effective way of issuing queriesby entering the textual form of the query instead of dragging and dropping elements, as would be done building worksheets.

The Distributed OLAP system 10 thus provides the kind of computer on-line analytical processing and modeling system that can utilize large relational data bases and at the same time offer large-scale modeling. System 10 requires less administrative attention to maintain, supports many interactive users and allows easy insertion of hypothetical values to produce "what-if" analysis. Control is distributed to the end-users, rather than being centrally controlled by an IT department. This end-user control has been accomplished by providing a system in which models can be easily and rapidly constructed by end users who need not be computer programmers. System 10 provides an HQL language that can be used to query these models which have been constructed in accordance with rule sets establishing the domains in which rules apply. Hierarchies of priorities are maintained among user-entered values and formulas, datamaps and autoformulas. System 10 also provides user interface tools such as the Cell Explorer, which allow users to audit the means by which the value of each cell is calculated. This allows users to understand the workings of the models more fully, and to participate in the building and querying of models in a much more informed manner. All of these components contribute to making control of data modeling truly "distributed" among the users.

In addition to the above mentioned examples, various other modifications and alterations of the inventive system 10 may be made without departing from the invention. Accordingly, the above disclosure is not to be considered as limiting and the appended claims are to be interpreted as encompassing the true spirit and the entire scope of the invention.

Industrial Applicability

The present Distributed On-Line Analytical Processing system 10 is well suited for computer modeling of processes in any number of business applications. The ability to plan for contingencies can be crucial to the survival of a business in an increasingly complex world. As competition from foreign competitors grows, the number of variables affecting a company's performance has grown greatly. The ability to make predictions based on complex combinations of variables can have tremendous applications in many industries. It is this handling of complex variables that the present invention 10 is designed to facilitate by forming multidimensional computer models 50.

The present invention 10 calculates cell values "on the fly" in response to queries, and thus does not require the massive loading and pre-calculation of the entire data cube with accompanying large storage requirements, as in MOLAP. The present invention 10 is easy to administer, can support models 50 with very large dimensions 54, and can also support 15–20 or more dimensions 54 with almost unlimited subcubes 66. The present invention 10 allows for distributed control of business analysis processes while allowing full configurability of access rights, and supports advanced interactive analysis of large data warehouses by large user groups. Due to a unique modeling approach called "Domain Modeling™", users with no background in computer programming can design the methods by which cell contents are formulated. Users may also enter hypothetical values for easy contingency modeling and "what-if" analysis.

For just one example among very many, as seen in FIG. 3 previously, a holding company called Amalgamated having subsidiaries Acme, Bingo and Coronet could use the present invention 10 to create a datacube model 52 composed of cells 56 having the dimensions of Time 60, Organization 62 and Finance 64. The Time dimension 60 could contain elements 1996, Q1-1996, Q2-1996, Q3-1996 and Q4-1996; the Organization dimension 62 could contain elements Amalgamated, Acme, Bingo and Coronet; and the Finance dimension 64 could contain elements Profit, Revenue and Expenses. As part of the model building process, rules for manipulating data are established. In this example, the combined Revenue of the three subsidiaries are added for any one time period to give the Revenue for Amalgamated during that same time period. Similarly, Revenue for the element 1996 in the Time dimension is the sum of the Revenues for the four quarters Q1–Q4 for any particular Organization. The data for these calculations can be retrieved from databases 16 by the use of data maps. This data can further be processed by the use of formula rules or rule domains 60 associated with particular cells 56 or groups of cells. As a further example, another element 58 in the Time dimension 62 could be "1997", in which Revenue is projected to be 125% of the total 1996 value of Revenue. Therefore, a formula is established which will take the 1996 Revenue value and multiply it by 1.25.

By allowing entry of User Entered Values 96, the values otherwise calculated can be overridden to allow hypothetical scenarios to be viewed. In this example, different scenarios could be set up to test the effects of, for example, rising tax rates or declining prices of materials, which could be reflected in the Expenses element of the Financial dimension 65. Similarly, sales projections for one or more subsidiary companies could be entered in the Revenue element of the Financial dimension 65 to see how the performance of the Amalgamated Company as a whole would be affected. In this same manner, combinations of variables can be entered by use of User Entered Values 96 to make projections of company performance which would be difficult or perhaps impossible by other methods. The number of dimensions 54 available for model creation and use are not limited to the three represented by a cube 52 in the above example. It is possible to create very complex models of many more dimensions, thus allowing decisions to be made on the basis of a great number of variables.

The present invention 10 is useable by almost any business which deals with a number of changing variables, and in which the ability to make informed decisions from projections based on data is important. It is perhaps difficult to think of businesses in which these qualities do not apply. In particular, banking and investing firms can plan for the influence of changing interest rates or tax rates or even passage of new regulatory legislation. Manufacturers can use the present invention 10 to plan for the effect of business expansion by themselves or competitors, or introduction of new product lines. Merchants can use the present invention 10 to plan sales orders.

Prior art computer models required considerable time and expertise to establish and maintain them. The ease of use of the present invention opens up many applications to companies which may not have large Information Transfer departments. The fact that models can be developed by non-programmers allows many users (whose expertise may lie in other fields) to have access to powerful modeling techniques. Since the formulas used in calculating a particular cell value can be easily viewed, the basis of any projection can be discussed and analyzed with greater efficiency and understanding. Most importantly, new ideas can be attempted first in the modeling stage, rather than in the real world where experimentation can be costly and risky. Thus, by using the present invention 10 innovation is encouraged.

For the above, and other, reasons, it is expected that the DOLAP system 10 of the present invention will have widespread industrial applicability. Therefore, it is expected that the commercial utility of the present invention will be extensive and long lasting.

What is claimed is:

1. A method of modeling a plurality of variables in a hyperstructure in a computer modeling system having at least one data storage means, a data processing means, input means, and output means, the steps comprising:
   (A) obtaining measurements of physical objects and activities which are related to the entity to be modeled in the computer hyperstructure;
   (B) transforming said measurements into computer data which corresponds to the physical objects and activities external to the computer system;
   (C) constructing a plurality of independent dimensions from said computer data within a hyperstructure, where each dimension has at least one element;
   (D) creating a plurality of cells, each of which is associated with the intersection of at least two elements, each cell being capable of storing at least one value;
   (E) associating at least one rule domain with at least one cell, said rule domain including at least one means for assigning values to the associated cells; and
   (F) preparing a domain modeling rule set which determines which of said assigning means will provide the value associated with each of said cells, wherein the application of said domain modeling rule set to the hyperstructure causes a physical transformation of the data corresponding to said physical objects which are modeled in said hyperstructure.

2. The method of computer modeling of claim 1 wherein:
   the means of assigning values in step (E) is a rule selected from the group consisting of User Entered Formulas, autoformulas, User Entered Values, and datamaps.

3. The method of computer modeling of claim 1, wherein step (F) further comprises:
   creating a Do Not Aggregate List, a Datamap Rules List, an Autoformula List and a Rules List.

4. The method of computer modeling of claim 3 wherein step (F) further comprises:
   (a) gathering the rules;
   (b) processing the autoformulas;
   (c) processing the datamaps;
   (d) ordering the rules;
   (e) promoting the rules; and
   (f) processing rule conflicts.

5. The computer modeling method of claim 4, wherein step (a) includes:
   (1) building a Do Not Aggregate List;
   (2) getting the next rule;
   (3) if the rule is a datamap, then saving the datamap in the Datamap Rules List;
   (4) if the rule is an autoformula, then adding the rule to the Autoformula List;
   (5) if the rule is an aggregation, then creating a time summary property rule and adding the time summary property rule to the Rules List;
   (6) else adding the rule to the Rules List; and
   (7) repeating steps (2) through (6) until the last rule has been processed.

6. The computer modeling method of claim 5, wherein step (5) includes:
   (a) getting the next time summary property (TSP) from the model;
   (b) creating a new rule for that TSP;
   (c) adding this new rule to the Rules List; and
   (d) repeating steps (a) through (c) until all TSPs have been processed, and returning.

7. The computer modeling method of claim 6, wherein step (c) includes:
   (i) if the rule is not a list formula, then appending the rule to the Rules List, and returning;
   (ii) if the rule is a list formula, then fetching the first next element in the rule domain associated therewith;
   (iii) if said first next element does not have a "Do not aggregate" property, then fetching the second next element;
   (iv) if said first next element has a "Do not aggregate" property, and said first next element is in this rule's dimension, then fetching the second next element, else removing said first next element from the formula's domain; and
   (v) repeating steps (ii) through (iv) until all elements have been processed, then appending the rule to the Rules List and returning.

8. The computer modeling method of claim 4, wherein step (b) includes:
   (1) getting the next rule in the Autoformula List;
   (2) if the rule is not in the Time dimension, then adding the rule to the Rules List;
   (3) else creating a time summary property rule and adding the time summary property rule to the Rules List; and
   (4) repeating steps (1)–(3) until the last rule has been processed.

9. The computer modeling method of claim 4, wherein step (c) includes:
   (1) gathering hierarchies and levels from all dimensions;
   (2) getting the next rule from the Datamap Rules List;
   (3) setting all elements and dimensions as valid;
   (4) getting the next hierarchy;
   (5) getting the next level;
   (6) if this level is joinable to the previous level, then
      (a) if the level is first in its dimension, then turning off all elements in this dimension and adding this level's elements to the rule's domain;
      (b) if the level is not first in its dimension, then adding the level's elements to the rule's domain;
      (c) in either case (a) or (b), then
         (i) if datamap is a low level datamap, then getting the next hierarchy;
         (ii) if datamap is not a low level datamap, then getting the next level;
   (7) if this level is not joinable to the previous level, then getting the next level;
   (8) repeating steps (5), (6) and (7) until all levels in a hierarchy are processed;
   (9) repeating steps (4)–(8) until all hierarchies in a rule are processed, then turning off all elements not in the table's rule domain and adding the rule to the Rules List; and
   (10) repeating steps (2)–(9) until all rules are processed.

10. The computer modeling method of claim 4, wherein step (d) includes:
   (1) getting the next rule from the Rules List;
   (2) assigning a primary sort value depending on rule type;
   (3) assigning a secondary sort value depending on rule type;
   (4) repeating steps (1)–(3) until each rule has been assigned primary and secondary sort values; and
   (5) ordering the Rules List by primary and secondary sort values.

11. The computer modeling method of claim 4, wherein step (e) includes:
   (1) establishing a Trigger List;
   (2) getting the next rule from the Rules List;

(3) if the rule is a user entered value, or a user entered formula, then adding the rule to the Trigger List;

(4) else getting the next rule from the Rules List;

(5) repeating steps (2)–(4) until the last rule has been processed;

(6) getting the next rule from the Trigger List;

(7) getting the next autoformula from the Autoformula List;

(8) computing the affected elements from the autoformula's dimension which are superceded by the Trigger List to make a modified autoformula list;

(9) repeating steps (6) and (7) until all autoformulas are processed;

(10) getting the next autoformula from the modified autoformula list;

(11) creating a promoted autoformula rule;

(12) repeating steps (10) and (11) until all autoformulas are processed; and

(13) repeating steps (6)–(12) until all rules have been processed.

12. The computer modeling method of claim 4, wherein step (f) includes:

(1) getting the next rule from the Rules List;

(2) creating a check set consisting of all user entered values with equal specificity;

(3) creating a check set consisting of all high priority rules with equivalent specificity;

(4) creating a check set consisting of all non-commutative rules with low priority with equivalent specificity;

(5) creating a check set consisting of all remaining commutative, low priority rules with equivalent specificity from the same dimension;

(6) if any rule's domain intersects any rules in the check sets, then inserting a conflict rule with a rule domain equal to the intersection region ahead of the rule in the list, and saving references to the conflict rule;

(7) if there is no intersection, then getting the next rule from the Rules List; and (8) repeating steps (1)–(7) until all rules have been processed.

13. The method of computer modeling of claim 1, the steps further comprising:

(G) providing a computer data manipulation language suitable for expressing queries to obtain data from a hyperstructure.

14. The method of computer modeling of claim 1, the steps further:

(H) providing a user interface means by which the method of calculation of each cell value can be observed.

15. A method of querying a multidimensional computer modeling data structure in a computer system having at least one data storage means, data processing means, input means, output means, a hyperstructure constructed in one of said data storage means, a calculation engine, a domain modeling rule set preparation module, a query engine, and an evaluator which communicates with an SQL generator, a math library, a cache retrieval device and a sort and search processor, comprising the steps of:

(A) inputting a query;

(B) parsing the query;

(C) creating a query component tree;

(D) inputting model metadata into said domain modeling rule set preparation module;

(E) generating a domain modeling rule set from said domain modeling rule set preparation module;

(F) inputting said domain modeling rule set into said calculation engine;

(G) generating an execution tree with rules from said calculation engine;

(H) inputting said execution tree with rules to said query engine;

(I) generating an optimized execution tree from said query engine;

(J) inputting said optimized execution tree to said evaluator;

(K) communicating between said evaluator and a data reference means;

(L) generating an execution tree with results;

(M) repeating steps (C)–(L) if there had been any inner queries presented before the query as a whole can be addressed;

(N) packaging the query results; and (O) outputting query results.

16. The method of querying of claim 15, wherein:

said data reference means is selected from the group consisting of an SQL generator which communicates with a Relational Database Management System, a math library, a sort and search processor, and a cache retrieval means which communicates with a multi-dimension cache.

17. The method of querying of claim 15, wherein step (E) further comprises the steps of:

(a) gathering the rules;

(b) processing the autoformulas;

(c) processing the datamaps;

(d) ordering the rules;

(e) promoting the rules; and (f) processing rule conflicts.

18. A computer system for modeling a plurality of variables in a hyperstructure comprising:

at least one data storage means;

data processing means;

input means;

output means;

measurements of physical objects and activities which are related to the entity to be modeled in the computer hyperstructure which are transformed into computer data which corresponds to the physical objects and activities external to the computer system;

a plurality of independent dimensions within the hyperstructure constructed from said data, where each dimension has at least one element;

a plurality of cells, each of which is associated with the intersection of at least two elements, each cell being capable of storing at least one value;

at least one rule domain associated with at least one cell, each said rule domain including at least one means for assigning values to the associated cell; and a domain modeling rule set for determining which of said assigning means will provide the value associated with each of said cells, wherein the application of said domain modeling rule set to the hyperstructure causes a physical transformation of the data corresponding to said physical objects which are modeled in said hyperstructure.

* * * * *